(12) United States Patent
Chen et al.

(10) Patent No.: US 12,375,706 B2
(45) Date of Patent: Jul. 29, 2025

(54) HIGH LEVEL SYNTAX CONTROL OF LOOP FILTER

(71) Applicant: ALIBABA GROUP HOLDING LIMITED, Grand Cayman (KY)

(72) Inventors: Jie Chen, Beijing (CN); Jiancong Luo, Skillman, NJ (US); Yan Ye, San Diego, CA (US); Mohammed Golam Sarwer, Cupertino, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 18/644,993

(22) Filed: Apr. 24, 2024

(65) Prior Publication Data

US 2024/0276003 A1    Aug. 15, 2024

Related U.S. Application Data

(62) Division of application No. 18/046,423, filed on Oct. 13, 2022, now Pat. No. 12,003,751, which is a
(Continued)

(51) Int. Cl.
*H04N 19/46* (2014.01)
*H04N 19/117* (2014.01)
(Continued)

(52) U.S. Cl.
CPC .......... *H04N 19/46* (2014.11); *H04N 19/117* (2014.11); *H04N 19/174* (2014.11);
(Continued)

(58) Field of Classification Search
CPC .............................. H04N 19/46; H04N 19/174
(Continued)

(56) References Cited

U.S. PATENT DOCUMENTS

| 2011/0274158 A1 | 11/2011 | Fu et al. |
| 2013/0188733 A1 | 7/2013 | Van der Auwera et al. |

(Continued)

FOREIGN PATENT DOCUMENTS

| JP | 2023517084 A | 4/2023 |
| JP | 2023518352 A | 5/2023 |
| WO | WO 2020/057572 A1 | 3/2020 |

OTHER PUBLICATIONS

Japanese Office Action issued in corresponding Japanese Application No. 2022-556553 on Jun. 7, 2024 (14 pages).

(Continued)

*Primary Examiner* — Amir Shahnami
(74) *Attorney, Agent, or Firm* — Finnegan, Henderson, Farabow, Garrett & Dunner, LLP

(57) ABSTRACT

Methods and apparatuses for video encoding, comprising: receiving a video sequence; encoding the video sequence by using control flags for luma mapping with chroma scaling (LMCS) at a sequence level, a picture level, or a slice level, wherein the sequence level, the picture level, and the slice level are levels ranking from high to low; signaling a first control flag indicating whether the LMCS is enabled at a first level; and in response to the first control flag indicating the LMCS is enabled at the first level, signaling a second control flag indicating whether LMCS is enabled at a second level, wherein: the LMCS is enabled at the second level when a value of the second control flag equals to 1; the LMCS is disabled at the second level when the value of the second control flag equals to 0; and the second level is a lower level than the first level.

12 Claims, 41 Drawing Sheets

Related U.S. Application Data division of application No. 17/216,095, filed on Mar. 29, 2021, now Pat. No. 11,509,921.

(60) Provisional application No. 63/001,448, filed on Mar. 29, 2020.

(51) Int. Cl.
*H04N 19/169* (2014.01)
*H04N 19/174* (2014.01)
*H04N 19/186* (2014.01)
*H04N 19/82* (2014.01)

(52) U.S. Cl.
CPC ....... *H04N 19/186* (2014.11); *H04N 19/1883* (2014.11); *H04N 19/82* (2014.11)

(58) Field of Classification Search
USPC .................................................. 375/240.26
See application file for complete search history.

(56) References Cited

U.S. PATENT DOCUMENTS

| | | | |
|---|---|---|---|
| 2015/0350648 | A1 | 12/2015 | Fu et al. |
| 2017/0064339 | A1 | 3/2017 | Van der Auwera et al. |
| 2017/0163999 | A1* | 6/2017 | Li .................. H04N 19/105 |
| 2018/0063527 | A1 | 3/2018 | Chen et al. |
| 2019/0289301 | A1 | 9/2019 | Lim et al. |
| 2021/0006786 | A1 | 1/2021 | Gao et al. |
| 2021/0176501 | A1 | 6/2021 | Chen et al. |

OTHER PUBLICATIONS

Japanese Search Report issued in corresponding Japanese Application No. 2022-556553 on Jun. 4, 2024, 2023 (47 pages).

Bross et al., "Versatile Video Coding (Draft 8), "JVET-Q2001-vD, 17th Meeting: Brussels, BE, Jan. 7-17, 2020, 509 pages.

Chen et al., "Algorithm Description of Joint Exploration Test Model 7 (JEM 7)," JVET-G1001-v1, 7$^{th}$ Meeting: Torino, IT, Jul. 13-21, 2017, 50 pages.

Chen et al., "Algorithm Description of Joint Exploration Test Model 8 (JEM 8)," JVET-Q2002-v1, 17$^{th}$ Meeting: Brussels, BE, Jan. 7-17, 2020, 91 pages.

International Telecommunications Union "Series H: Audiovisual and Multimedia Systems Infrastructure of audiovisual services—Coding of moving video", ITU-T Telecommunication Standardization Sector of ITU, Apr. 2013, 317 pages.

Jem, https://jvet.hhi.fraunhofer.de/svn/svn_HMJEMSoftware.

Segall et al., "Joint Call for Proposals on Video Compression with Capability beyond HEVC," JVET-H1002 (v6), 8$^{th}$ Meeting: Macao, CN, Oct. 18-24, 2017, 27 pages.

Sullivan et al., "Overview of the High Efficiency Video Coding (HEVC) Standard," IEE Transactions on Circuits and Systems for Video Technology, vol. 22, No. 12, pp. 1649-1668 (2012).

PCT International Search Report and Written Opinion mailed Jun. 23, 2021, issued in corresponding International Application No. PCT/US2021/024660 (11 pgs.).

Bross et al., "Versatile Video Coding (Draft 8)," JVET-Q2001-vE, 17th Meeting: Brussels, BE, Jan. 7-17, 2020, 510 pages.

European Patent Office Communication issued for Application No. 21782055.4 the Supplementary European Search Report (Art. 153(7) EPC) and the European search opinion dated Jan. 30, 2024, 7 pages.

First Office Action issued in corresponding Chinese Application No. 202180026114.1 on Dec. 20, 2024, (6 pages).

Chen et al., "AHG9: Allowing slice-level scaling list and LMCS," JVET-Q0182-v1, 17th Meeting: Brussels, BE, Jan. 7-17, 2020, 5 pages.

\* cited by examiner

| | Descriptor |
|---|---|
| seq_parameter_set_rbsp( ) { | |
| ... | |
| sps_lmcs_enabled_flag | u(1) |

FIG. 5

| | Descriptor |
|---|---|
| picture_header_structure( ) { | |
| ... | |
| if( sps_lmcs_enabled_flag ) { | |
| ph_lmcs_enabled_flag | u(1) |
| if( ph_lmcs_enabled_flag ) { | |
| ph_lmcs_aps_id | u(2) |
| if( ChromaArrayType != 0 ) | |
| ph_chroma_residual_scale_flag | u(1) |
| ~ | |
| } | |

FIG. 6

| | Descriptor |
|---|---|
| slice_header( ) { | |
| ... | |
| if( ph_lmcs_enabled_flag ) | |
|   slice_lmcs_enabled_flag | u(1) |

FIG. 7

| | Descriptor |
|---|---|
| seq_parameter_set_rbsp( ) { | |
| ... | |
| sps_alf_enabled_flag | u(1) |
| if( sps_alf_enabled_flag && ChromaArrayType != 0 ) | |
| sps_ccalf_enabled_flag | u(1) |

FIG. 8A

| pic_parameter_set_rbsp( ) { | Descriptor |
|---|---|
| ... | |
| alf_info_in_ph_flag | u(1) |
| | |

FIG. 8B

| | Descriptor |
|---|---|
| picture_header_structure( ) { | |
| ... | |
| if( sps_alf_enabled_flag && alf_info_in_ph_flag ) { | |
|   ph_alf_enabled_flag | u(1) |
|   if( ph_alf_enabled_flag ) { | |
|     ph_num_alf_aps_ids_luma | u(3) |
|     for( i = 0; i < ph_num_alf_aps_ids_luma; i++ ) | |
|       ph_alf_aps_id_luma[ i ] | u(3) |
|     if( ChromaArrayType != 0 ) | |
|       ph_alf_chroma_idc | u(2) |
|     if( ph_alf_chroma_idc ) | |
|       ph_alf_aps_id_chroma | u(3) |
|     if( sps_ccalf_enabled_flag ) { | |
|       ph_cc_alf_cb_enabled_flag | u(1) |
|       if( ph_cc_alf_cb_enabled_flag ) | |
|         ph_cc_alf_cb_aps_id | u(3) |
|       ph_cc_alf_cr_enabled_flag | u(1) |
|       if( ph_cc_alf_cr_enabled_flag ) | |
|         ph_cc_alf_cr_aps_id | u(3) |
| ~ | |
| } | |

FIG. 9

| | Descriptor |
|---|---|
| slice_header( ) { | |
| ... | |
| if( sps_alf_enabled_flag && !alf_info_in_ph_flag ) { | |
|   slice_alf_enabled_flag | u(1) |
|   if( slice_alf_enabled_flag ) { | |
|     slice_num_alf_aps_ids_luma | u(3) |
|     for( i = 0; i < slice_num_alf_aps_ids_luma; i++ ) | |
|       slice_alf_aps_id_luma[ i ] | u(3) |
|     if( ChromaArrayType != 0 ) | |
|       slice_alf_chroma_idc | u(2) |
|     if( slice_alf_chroma_idc ) | |
|       slice_alf_aps_id_chroma | u(3) |
|     if( sps_ccalf_enabled_flag ) { | |
|       slice_cc_alf_cb_enabled_flag | u(1) |
|       if( slice_cc_alf_cb_enabled_flag ) | |
|         slice_cc_alf_cb_aps_id | u(3) |
|       slice_cc_alf_cr_enabled_flag | u(1) |
|       if( slice_cc_alf_cr_enabled_flag ) | |
|         slice_cc_alf_cr_aps_id | u(3) |
|     } | |
| } | |

FIG. 10

| | Descriptor |
|---|---|
| seq_parameter_set_rbsp( ) { | |
| ⋮ | |
| sps_sao_enabled_flag | u(1) |

FIG. 11

| | Descriptor |
|---|---|
| pic_parameter_set_rbsp( ) { | |
| ... | |
| sao_info_in_ph_flag | u(1) |

FIG. 12

| | Descriptor |
|---|---|
| picture_header_structure( ) { | |
| ... | |
| if( sps_sao_enabled_flag && sao_info_in_ph_flag ) { | |
|   ph_sao_luma_enabled_flag | u(1) |
|   if( ChromaArrayType != 0 ) | |
|     ph_sao_chroma_enabled_flag | u(1) |
| } | |

FIG. 13

| | Descriptor |
|---|---|
| slice_header( ) { | |
| ... | |
| if( sps_sao_enabled_flag && !sao_info_in_ph_flag ) { | |
|    slice_sao_luma_flag | u(1) |
|    if( ChromaArrayType != 0 ) | |
|      slice_sao_chroma_flag | u(1) |
| } | |

FIG. 14

| | Descriptor |
|---|---|
| pic_parameter_set_rbsp( ) { | |
| ... | |
|   deblocking_filter_control_present_flag | u(1) |
|   if( deblocking_filter_control_present_flag ) { | |
|     deblocking_filter_override_enabled_flag | u(1) |
|     pps_deblocking_filter_disabled_flag | u(1) |
|     if( !pps_deblocking_filter_disabled_flag ) { | |
|       pps_beta_offset_div2 | se(v) |
|       pps_tc_offset_div2 | se(v) |
|       pps_cb_beta_offset_div2 | se(v) |
|       pps_cb_tc_offset_div2 | se(v) |
|       pps_cr_beta_offset_div2 | se(v) |
|       pps_cr_tc_offset_div2 | se(v) |
|     } | |
|   } | |
| ... | |
|   if( deblocking_filter_override_enabled_flag ) | |
|     dbf_info_in_ph_flag | u(1) |

FIG. 15

| | Descriptor |
|---|---|
| picture_header_structure( ) { | |
| ... | |
| if( deblocking_filter_override_enabled_flag && dbf_info_in_ph_flag ) { | |
|   ph_deblocking_filter_override_flag | u(1) |
|   if( ph_deblocking_filter_override_flag ) { | |
|     ph_deblocking_filter_disabled_flag | u(1) |
|     if( !ph_deblocking_filter_disabled_flag ) { | |
|       ph_beta_offset_div2 | se(v) |
|       ph_tc_offset_div2 | se(v) |
|       ph_cb_beta_offset_div2 | se(v) |
|       ph_cb_tc_offset_div2 | se(v) |
|       ph_cr_beta_offset_div2 | se(v) |
|       ph_cr_tc_offset_div2 | se(v) |
|     } | |
| ... | |
| } | |

FIG. 16

| | Descriptor |
|---|---|
| slice_header( ) { | |
| ... | |
| if( deblocking_filter_override_enabled_flag && !dbf_info_in_ph_flag ) | |
|   slice_deblocking_filter_override_flag | u(1) |
| if( slice_deblocking_filter_override_flag ) { | |
|   slice_deblocking_filter_disabled_flag | u(1) |
| if( !slice_deblocking_filter_disabled_flag ) { | |
|   slice_beta_offset_div2 | se(v) |
|   slice_tc_offset_div2 | se(v) |
|   slice_cb_beta_offset_div2 | se(v) |
|   slice_cb_tc_offset_div2 | se(v) |
|   slice_cr_beta_offset_div2 | se(v) |
|   slice_cr_tc_offset_div2 | se(v) |
|   } | |
| } | |

FIG. 17

| | |
|---|---|
| *sps_lmcs_enabled_flag* | when sps_lmcs_enabled_flag is equal to 1, luma mapping with chroma scaling ~~is~~ may be used in the CLVS. When sps_lmcs_enabled_flag is equal to 0, luma mapping with chroma scaling is not used in the CLVS. |
| *ph_lmcs_enabled_flag* | when ph_lmcs_enabled_flag is equal to 1, luma mapping with chroma scaling ~~is~~ may be enabled for one, or more, or all slices associated with the PH. When ph_lmcs_enabled_flag is equal to 0, luma mapping with chroma scaling ~~may be~~ is turned off for ~~one, or more,~~ or all slices associated with the PH. When not present, the value of ph_lmcs_enabled_flag is inferred to be equal to 0. |
| *ph_chroma_residual_scale_flag* | when ph_chroma_residual_scale_flag is equal to 1, chroma residual scaling ~~is~~ may be enabled for one, or more, or the all slices associated with the PH. When ph_chroma_residual_scale_flag is equal to 0, chroma residual scaling ~~may be~~ is turned off for ~~one, or more,~~ or all slices associated with the PH. When ph_chroma_residual_scale_flag is not present, it is inferred to be equal to 0. |
| *slice_lmcs_enabled_flag* | when slice_lmcs_enabled_flag is equal to 1, luma mapping ~~with chroma scaling~~ and chroma scaling may be enabled for the current slice. When slice_lmcs_enabled_flag is equal to 0, luma mapping with chroma scaling is not enabled for the current slice. When slice_lmcs_enabled_flag is not present, it is inferred to be equal to 0. |
| *sps_alf_enabled_flag* | when sps_alf_enabled_flag is equal to 0, the adaptive loop filter is turned off. When sps_alf_enabled_flag is equal to 1, the adaptive loop filter ~~is~~ may be enabled. |
| *sps_sao_enabled_flag* | when sps_sao_enabled_flag is equal to 1, the sample adaptive offset process ~~is~~ may be applied to the reconstructed picture after the deblocking filter process. sps_sao_enabled_flag equal to 0 specifies that the sample adaptive offset process is not applied to the reconstructed picture after the deblocking filter process. |

FIG. 18

| | Descriptor |
|---|---|
| pic_parameter_set_rbsp( ) { | |
| ... | |
| ~~sao_info_in_ph_flag~~ | ~~u(1)~~ |

FIG. 19

| | Descriptor |
|---|---|
| picture_header_structure( ) { | |
| ... | |
| if( sps_alf_enabled_flag && alf_info_in_ph_flag ) { | |
|   ph_alf_enabled_flag | u(1) |
|   if( ph_alf_enabled_flag ) { | |
|     ph_num_alf_aps_ids_luma | u(3) |
|     for( i = 0; i < ph_num_alf_aps_ids_luma; i++ ) | |
|       ph_alf_aps_id_luma[ i ] | u(3) |
|     if( ChromaArrayType != 0 ) | |
|       ph_alf_chroma_idc | u(2) |
|     if( ph_alf_chroma_idc ) | |
|       ph_alf_aps_id_chroma | u(3) |
|     if( sps_ccalf_enabled_flag ) { | |
|       ph_cc_alf_cb_enabled_flag | u(1) |
|       if( ph_cc_alf_cb_enabled_flag ) | |
|         ph_cc_alf_cb_aps_id | u(3) |
|       ph_cc_alf_cr_enabled_flag | u(1) |
|       if( ph_cc_alf_cr_enabled_flag ) | |
|         ph_cc_alf_cr_aps_id | u(3) |
| ... | |
| } | |

FIG. 20

| | |
|---|---|
| if( sps_alf_enabled_flag && !alf_info_in_ph_flag ph_alf_enabled_flag ) { | |
| slice_alf_enabled_flag | u(1) |
| if( slice_alf_enabled_flag ) { | |
| slice_num_alf_aps_ids_luma | u(3) |
| for( i = 0; i < slice_num_alf_aps_ids_luma; i++ ) | |
| slice_alf_aps_id_luma[ i ] | u(3) |
| if( ChromaArrayType != 0 ) | |
| slice_alf_chroma_idc | u(2) |
| if( slice_alf_chroma_idc ) | |
| slice_alf_aps_id_chroma | u(3) |
| if( sps_ccalf_enabled_flag ) { | |
| slice_cc_alf_cb_enabled_flag | u(1) |
| if( slice_cc_alf_cb_enabled_flag ) | |
| slice_cc_alf_cb_aps_id | u(3) |
| if( ph_cc_alf_cr_enabled_flag ) | |
| slice_cc_alf_cr_enabled_flag | u(1) |
| if( slice_cc_alf_cr_enabled_flag ) | |
| slice_cc_alf_cr_aps_id | u(3) |
| } | |
| } | |
| ~ | |

FIG. 21

| |
|---|
| *sps_lmcs_enabled_flag*: when sps_lmcs_enabled_flag is equal to 1, luma mapping with chroma scaling ~~is~~ may be used in the CLVS. When sps_lmcs_enabled_flag is equal to 0, luma mapping with chroma scaling is not used in the CLVS. |
| *ph_lmcs_enabled_flag*: when ph_lmcs_enabled_flag is equal to 1, luma mapping with chroma scaling ~~is~~ may be enabled for one, or more, or all slices associated with the PH. When ph_lmcs_enabled_flag is equal to 0, luma mapping with chroma scaling ~~may be~~ is turned off for ~~one, or more,~~ or all slices associated with the PH. When not present, the value of ph_lmcs_enabled_flag is inferred to be equal to 0. |
| *sps_alf_enabled_flag*: when sps_alf_enabled_flag is equal to 0, the adaptive loop filter is turned off. When sps_alf_enabled_flag is equal to 1 specifies that the adaptive loop filter ~~is~~ may be enabled. |
| *sps_ccalf_enabled_flag*: when sps_ccalf_enabled_flag is equal to 0, the cross-component adaptive loop filter is turned off. When sps_ccalf_enabled_flag is equal to 1, the cross-component adaptive loop filter may be enabled. |
| ~~*alf_info_in_ph_flag* : when alf_info_in_ph_flag is equal to 1, ALF information is present in the PH syntax structure and not present in slice headers referring to the PPS that do not contain a PH syntax structure. When alf_info_in_ph_flag is equal to 0, ALF information is not present in the PH syntax structure and may be present in slice headers referring to the PPS that do not contain a PH syntax structure.~~ |
| *ph_alf_enabled_flag*: when ph_alf_enabled_flag is equal to 1, adaptive loop filter is may be enabled for one, or more, or all slices associated with the PH and may be applied to Y, Cb, or Cr colour component in the slices. When ph_alf_enabled_flag is equal to 0, adaptive loop filter ~~may be~~ is disabled for ~~one, or more,~~ or all slices associated with the PH. When not present, ph_alf_enabled_flag is inferred to be equal to 0. |
| *ph_cc_alf_cb_enabled_flag*: when ph_cc_alf_cb_enabled_flag is equal to 1, cross-component filter for Cb colour component ~~is~~ may be enabled for one, or more, or all slices associated with the PH and may be applied to Cb colour component in the slices. When ph_cc_alf_cb_enabled_flag ia equal to 0, cross-component filter for Cb colour component ~~may be~~ is disabled for ~~one, or more,~~ or all slices associated with the PH. When not present, ph_cc_alf_cb_enabled_flag is inferred to be equal to 0. |
| *ph_cc_alf_cr_enabled_flag*: when ph_cc_alf_cr_enabled_flag is equal to 1, cross-compoent filter for Cr colour component ~~is~~ may be enabled for one, or more, or all slices associated with the PH and may be applied to Cr colour component in the slices. ph_cc_alf_cr_enabled_flag equal to 0 specifies that cross-component filter for Cr colour component ~~may be~~ is disabled for ~~one, or more,~~ or all slices associated with the PH. When not present, ph_cc_alf_cr_enabled_flag is inferred to be equal to 0. |

FIG. 22A

| |
|---|
| *slice_alf_enabled_flag* : when slice_alf_enabled_flag is equal to 1, adaptive loop filter is enabled and may be applied to Y, Cb, or Cr colour component in a slice. When slice_alf_enabled_flag is equal to 0, adaptive loop filter is turned off for all colour components in a slice. When not present, the value of slice_alf_enabled_flag is inferred to be equal to ph_alf_enabled_flag 0. |
| ~~*slice_num_alf_aps_ids_luma* : slice_num_alf_aps_ids_luma specifies the number of ALF APSs that the slice refers to. When slice_alf_enabled_flag is equal to 1 and slice_num_alf_aps_ids_luma is not present, the value of slice_num_alf_aps_ids_luma is inferred to be equal to the value of ph_num_alf_aps_ids_luma.~~ |
| ~~*slice_alf_aps_id_luma[ i ]* : specifies the adaptation_parameter_set_id of the i-th ALF_APS that the luma component of the slice refers to. The TemporalId of the APS NAL unit having aps_params_type equal to ALF_APS and adaptation_parameter_set_id equal to slice_alf_aps_id_luma[ i ] shall be less than or equal to the TemporalId of the coded slice NAL unit. When slice_alf_enabled_flag is equal to 1 and slice_alf_aps_id_luma[ i ] is not present, the value of slice_alf_aps_id_luma[ i ] is inferred to be equal to the value of ph_alf_aps_id_luma[ i ].~~ |
| ~~The value of alf_luma_filter_signal_flag of the APS NAL unit having aps_params_type equal to ALF_APS and adaptation_parameter_set_id equal to slice_alf_aps_id_luma[ i ] shall be equal to 1.~~ |
| ~~*slice_alf_aps_id_chroma* : when slice_alf_aps_id_chroma is equal to 0, the adaptive loop filter is not applied to Cb and Cr colour components. When slice_alf_aps_id_chroma is equal to 1, the adaptive loop filter is applied to the Cb colour component. When slice_alf_aps_id_chroma is equal to 2, the adaptive loop filter is applied to the Cr colour component. When slice_alf_aps_id_chroma is equal to 3, the adaptive loop filter is applied to Cb and Cr colour components. When slice_alf_aps_id_chroma is not present, it is inferred to be equal to ph_alf_chroma_idc.~~ |
| ~~*slice_alf_aps_id_chroma* : specifies the adaptation_parameter_set_id of the ALF APS that the chroma component of the slice refers to. The TemporalId of the APS NAL unit having aps_params_type equal to ALF_APS and adaptation_parameter_set_id equal to slice_alf_aps_id_chroma shall be less than or equal to the TemporalId of the coded slice NAL unit. When slice_alf_enabled_flag is equal to 1 and slice_alf_aps_id_chroma is not present, the value of slice_alf_aps_id_chroma is inferred to be equal to the value of ph_alf_aps_id_chroma.~~ |
| ~~The value of alf_chroma_filter_signal_flag of the APS NAL unit having aps_params_type equal to ALF_APS and adaptation_parameter_set_id equal to slice_alf_aps_id_chroma shall be equal to 1.~~ |

FIG. 22B

| |
|---|
| *slice_cc_alf_cb_enabled_flag*: when slice_cc_alf_cb_enabled_flag is equal to 0, the cross-component filter is not applied to the Cb colour component. When slice_cc_alf_cb_enabled_flag is equal to 1, the cross-component filter is enabled and may be applied to the Cb colour component. When slice_cc_alf_cb_enabled_flag is not present, it is inferred to be equal to ~~ph_cc_alf_cb_enabled_flag 0~~. |
| ~~slice_cc_alf_cb_aps_id specifies the adaptation_parameter_set_id that the Cb colour component of the slice refers to.~~ |
| ~~The TemporalId of the APS NAL unit having aps_params_type equal to ALF_APS and adaptation_parameter_set_id equal to slice_cc_alf_cb_aps_id shall be less than or equal to the TemporalId of the coded slice NAL unit. When slice_cc_alf_cb_enabled_flag is equal to 1 and slice_cc_alf_cb_aps_id is not present, the value of slice_cc_alf_cb_aps_id is inferred to be equal to the value of ph_cc_alf_cb_aps_id.~~ |
| ~~The value of alf_cc_cb_filter_signal_flag of the APS NAL unit having aps_params_type equal to ALF_APS and adaptation_parameter_set_id equal to slice_cc_alf_cb_aps_id shall be equal to 1.~~ |
| *slice_cc_alf_cr_enabled_flag*: when slice_cc_alf_cr_enabled_flag is equal to 0, the cross-component filter is not applied to the Cr colour component. When slice_cc_alf_cb_enabled_flag is equal to 1, the cross-component adaptive loop filter is enabled and may be applied to the Cr colour component. When slice_cc_alf_cr_enabled_flag is not present, it is inferred to be equal to ~~ph_cc_alf_cr_enabled_flag 0~~. |
| ~~slice_cc_alf_cr_aps_id specifies the adaptation_parameter_set_id that the Cr colour component of the slice refers to. The TemporalId of the APS NAL unit having aps_params_type equal to ALF_APS and adaptation_parameter_set_id equal to slice_cc_alf_cr_aps_id shall be less than or equal to the TemporalId of the coded slice NAL unit. When slice_cc_alf_cr_enabled_flag is equal to 1 and slice_cc_alf_cr_aps_id is not present, the value of slice_cc_alf_cr_aps_id is inferred to be equal to the value of ph_cc_alf_cr_aps_id.~~ |
| ~~The value of alf_cc_cr_filter_signal_flag of the APS NAL unit having aps_params_type equal to ALF_APS and adaptation_parameter_set_id equal to slice_cc_alf_cr_aps_id shall be equal to 1.~~ |

FIG. 22C

| | Descriptor |
|---|---|
| pic_parameter_set_rbsp( ) { | |
| ... | |
| ~~sao_info_in_ph_flag~~ | ~~u(1)~~ |

FIG. 23

| | Descriptor |
|---|---|
| picture_header_structure( ) { | |
| ... | |
| if( sps_sao_enabled_flag ~~&& sao_info_in_ph_flag~~ ) { | |
|   ph_sao_luma_enabled_flag | u(1) |
|   if( ChromaArrayType != 0 ) | |
|     ph_sao_chroma_enabled_flag | u(1) |
| } | |

FIG. 24

| | Descriptor |
|---|---|
| slice_header( ) { | |
| ... | |
| ~~if( sps_sao_enabled_flag && !sao_info_in_ph_flag )~~ | |
| if( ph_sao_luma_enabled_flag) | |
|   slice_sao_luma_flag | u(1) |
| if( ChromaArrayType != 0 && ph_sao_chroma_enabled_flag) | |
|   slice_sao_chroma_flag | u(1) |
| ~~}~~ | |

FIG. 25

| |
|---|
| *sps_sao_enabled_flag*: when sps_sao_enabled_flag is equal to 1, the sample adaptive offset process ~~is~~ may be applied to the reconstructed picture after the deblocking filter process. sps_sao_enabled_flag equal to 0 specifies that the sample adaptive offset process is not applied to the reconstructed picture after the deblocking filter process. |
| ~~*sao_info_in_ph_flag*: when sao_info_in_ph_flag is equal to 1, SAO filter information is present in the PH syntax structure and not present in slice headers referring to the PPS that do not contain a PH syntax structure. When sao_info_in_ph_flag is equal to 0, SAO filter information is not present in the PH syntax structure and may be present in slice headers referring to the PPS that do not contain a PH syntax structure.~~ |
| *ph_sao_luma_enabled_flag*: when ph_sao_luma_enabled_flag is equal to 1, SAO ~~is~~ may be enabled for the luma component in one, or more, or all slices associated with the PH. When ph_sao_luma_enabled_flag isequal to 0, SAO for the luma component ~~may be~~ is disabled for ~~one, or more, or~~ all slices associated with the PH. When ph_sao_luma_enabled_flag is not present, it is inferred to be equal to 0. |
| *ph_sao_chroma_enabled_flag*: when ph_sao_chroma_enabled_flag is equal to 1, SAO ~~is~~ may be enabled for the chroma component in one, or more, or all slices associated with the PH; ph_sao_chroma_enabled_flag equal to 0 specifies that SAO for chroma component ~~may be~~ is disabled for ~~one, or more, or~~ all slices associated with the PH. When ph_sao_chroma_enabled_flag is not present, it is inferred to be equal to 0. |
| *slice_sao_luma_flag*: when slice_sao_luma_flag is equal to 1, SAO is enabled for the luma component in the current slice. When slice_sao_luma_flag is equal to 0, SAO is turned off for the luma component in the current slice. When slice_sao_luma_flag is not present, it is inferred to be equal to ~~ph_sao_luma_enabled_flag~~ 0. |
| *slice_sao_chroma_flag*: when slice_sao_chroma_flag is equal to 1, SAO is enabled for the chroma component in the current slice. When slice_sao_chroma_flag is equal to 0, SAO is turned off for the chroma component in the current slice. When slice_sao_chroma_flag is not present, it is inferred to be equal to ~~ph_sao_chroma_enabled_flag~~ 0. |

FIG. 26

| seq_parameter_set_rbsp( ) { | Descriptor |
|---|---|
| ... | |
| sps_deblocking_filter_disabled_flag | u(1) |

FIG. 27

| | Descriptor |
|---|---|
| pic_parameter_set_rbsp( ) { | |
| ... | |
| deblocking_filter_control_present_flag | u(1) |
| if( deblocking_filter_control_present_flag ) { | |
| deblocking_filter_override_enabled_flag | u(1) |
| pps_deblocking_filter_disabled_flag | u(1) |
| if( !pps_deblocking_filter_disabled_flag ) { | |
| pps_beta_offset_div2 | se(v) |
| pps_tc_offset_div2 | se(v) |
| pps_cb_beta_offset_div2 | se(v) |
| pps_cb_tc_offset_div2 | se(v) |
| pps_cr_beta_offset_div2 | se(v) |
| pps_cr_tc_offset_div2 | se(v) |
| } | |
| } | |
| ... | |
| if( deblocking_filter_override_enabled_flag ) | |
| dbf_info_in_ph_flag | u(1) |

FIG. 28

| | Descriptor |
|---|---|
| picture_header_structure( ) { | |
| ... | |
| if( deblocking_filter_override_enabled_flag && dbf_info_in_ph_flag ) { | |
|   ph_deblocking_filter_override_flag | u(1) |
|   if( ph_deblocking_filter_override_flag ) { | |
|     ph_deblocking_filter_disabled_flag | u(1) |
|     if( !ph_deblocking_filter_disabled_flag ) { | |
|       ph_beta_offset_div2 | se(v) |
|       ph_tc_offset_div2 | se(v) |
|       ph_cb_beta_offset_div2 | se(v) |
|       ph_cb_tc_offset_div2 | se(v) |
|       ph_cr_beta_offset_div2 | se(v) |
|       ph_cr_tc_offset_div2 | se(v) |
|     } | |
|   } | |
| } | |

FIG. 29

| | Descriptor |
|---|---|
| slice_header( ) { | |
| ... | |
| if( deblocking_filter_override_enabled_flag && !dbf_info_in_ph_flag ) | |
|   slice_deblocking_filter_override_flag | u(1) |
| if( slice_deblocking_filter_override_flag ) { | |
|   slice_deblocking_filter_disabled_flag | u(1) |
| if( !slice_deblocking_filter_disabled_flag ) { | |
|   slice_beta_offset_div2 | se(v) |
|   slice_tc_offset_div2 | se(v) |
|   slice_cb_beta_offset_div2 | se(v) |
|   slice_cb_tc_offset_div2 | se(v) |
|   slice_cr_beta_offset_div2 | se(v) |
|   slice_cr_tc_offset_div2 | se(v) |
|   } | |
| } | |

FIG. 30

*sps_deblocking_filter_disabled_flag* : when sps_deblocking_filter_disabled_flag is equal to 1, the deblocking filter is not applied for the slices referring to the SPS. When sps_deblocking_filter_disabled_flag is equal to 0, the deblocking filter may be applied for the slices referring to the SPS.

*deblocking_filter_control_present_flag* : when deblocking_filter_control_present_flag is equal to 1, deblocking filter control syntax elements is present in the PPS. When deblocking_filter_control_present_flag is equal to 0, deblocking filter control syntax elements is absent in the PPS. When the value of sps_deblocking_filter_disabled_flag equal to 1, the value of deblocking_filter_control_present_flag should be 0.

*deblocking_filter_override_enabled_flag* : when deblocking_filter_override_enabled_flag is equal to 1 ph_deblocking_filter_override_flag is present in the PHs referring to the PPS or slice_deblocking_filter_override_flag is present in the slice headers referring to the PPS. When deblocking_filter_override_enabled_flag is equal to 0, ph_deblocking_filter_override_flag is absent in PHs referring to the PPS or slice_deblocking_filter_override_flag is absent in slice headers referring to the PPS. When not present, the value of deblocking_filter_override_enabled_flag is inferred to be equal to 0.

*pps_deblocking_filter_disabled_flag* : when pps_deblocking_filter_disabled_flag is equal to 1, the operation of deblocking filter is not applied for slices referring to the PPS of ~~in which~~ slice_deblocking_filter_disabled_flag and ph_deblockig_filter_disabled_flag ~~are is~~ not present. When pps_deblocking_filter_disabled_flag is equal to 0, the operation of the deblocking filter is applied for slices referring to the PPS of ~~in~~ which slice_deblocking_filter_disabled_flag and ph_deblocking_filter_disabled_flag ~~are is~~ not present. When not present, the value of pps_deblocking_filter_disabled_flag is inferred to be equal to 0 sps_deblocking_filter_disabled_flag.

*pps_deblocking_filter_disabled_flag* (alternatively): when pps_deblocking_filter_disabled_flag is equal to 1, the operation of deblocking filter is not applied for slices referring to the PPS when deblocking_filter_override_enabled_flag is equal to 0 ~~in which~~ ~~slice_deblocking_filter_disabled_flag is not present~~. When pps_deblocking_filter_disabled_flag is equal to 0, the operation of the deblocking filter is applied for slices referring to the PPS when deblocking_filter_override_enabled_flag is equal to 0 ~~in which~~ ~~slice_deblocking_filter_disabled_flag is not present~~. When not present, the value of pps_deblocking_filter_disabled_flag is inferred to be equal to 0.

FIG. 31A

*ph_deblocking_filter_override_flag*: when ph_deblocking_filter_override_flag is equal to 1, deblocking parameters are present in the PH. When ph_deblocking_filter_override_flag is equal to 0, deblocking parameters are not present in the PH. When not present, the value of ph_deblocking_filter_override_flag is inferred to be equal to 0.

*ph_deblocking_filter_disabled_flag*: when ph_deblocking_filter_disabled_flag is equal to 1, the operation of the deblocking filter is not applied for the slices associated with the PH in which slice_deblocking_filter_disabled_flag is not present. When ph_deblocking_filter_disabled_flag is equal to 0, the operation of the deblocking filter is applied for the slices associated with the PH in which slice_deblocking_filter_disabled_flag is not present. When ph_deblocking_filter_disabled_flag is not present, it is inferred to be equal to pps_deblocking_filter_disabled_flag.

*slice_deblocking_filter_override_flag*: when slice_deblocking_filter_override_flag is equal to 1, deblocking parameters are present in the slice header. When slice_deblocking_filter_override_flag is equal to 0, deblocking parameters are not present in the slice header. When not present, the value of slice_deblocking_filter_override_flag is inferred to be equal to ph_deblocking_filter_override_flag.

*slice_deblocking_filter_disabled_flag*: when slice_deblocking_filter_disabled_flag is equal to 1, the operation of the deblocking filter is not applied for the current slice. When slice_deblocking_filter_disabled_flag is equal to 0, the operation of the deblocking filter is applied for the current slice. When slice_deblocking_filter_disabled_flag is not present, it is inferred to be equal to ph_deblocking_filter_disabled_flag.

FIG. 31B

HIGH LEVEL SYNTAX CONTROL OF LOOP FILTER

CROSS-REFERENCE TO RELATED APPLICATIONS

This application is a divisional application of U.S. application Ser. No. 18/046,423, filed on Oct. 13, 2022, which is a divisional application of U.S. application Ser. No. 17/216,095, filed on Mar. 29, 2021, which claims priority to U.S. Provisional Patent Application No. 63/001,448, filed on Mar. 29, 2020. All of these applications are incorporated herein by reference in their entireties.

TECHNICAL FIELD

The present disclosure generally relates to video data processing, and more particularly, to high level syntax control of loop filter.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (e.g., HEVC/H.265) standard, the Versatile Video Coding (e.g., VVC/H.266) standard, and AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

The embodiments of the present disclosure provide a video encoding method, comprising: receiving a video sequence; encoding the video sequence by using control flags for luma mapping with chroma scaling (LMCS) at a sequence level, a picture level, or a slice level, wherein the sequence level, the picture level, and the slice level are levels ranking from high to low; signaling a first control flag indicating whether the LMCS is enabled at a first level; and in response to the first control flag indicating the LMCS is enabled at the first level, signaling a second control flag indicating whether LMCS is enabled at a second level, wherein: the LMCS is enabled at the second level when a value of the second control flag equals to 1; the LMCS is disabled at the second level when the value of the second control flag equals to 0; and the second level is a lower level than the first level.

The embodiments of the present disclosure provide a video encoding method, comprising: receiving a video sequence; encoding the video sequence by using control flags for adaptive loop filter (ALF) at a sequence level, a picture level, or a slice level, wherein the sequence level, the picture level, and the slice level are levels ranking from high to low; signaling a first control flag indicating whether the ALF is enabled at a first level; and in response to the first control flag indicating the ALF at the first level is enabled, signaling a second control flag indicating whether ALF is enabled at a second level, wherein: the ALF is enabled at the second level when a value of the second control flag equals to 1; the ALF is disabled at the second level when the value of the second control flag equals to 0; and the second level is a lower level than the first level.

The embodiments of the present disclosure provide a video encoding method, comprising: receiving a video sequence; encoding the video sequence by using control flags for sample adaptive offset (SAO) at a sequence level, a picture level, or a slice level, wherein the sequence level, the picture level, and the slice level are levels ranking from high to low; signaling a first control flag indicating whether the SAO is enabled at a first level; and in response to the first control flag indicating SAO is enabled at the first level, signaling a second control flag indicating whether the SAO is enabled at a second level, wherein: the SAO is enabled for a luma component at the second level when a value of the second control flag equals to 1; the SAO is disabled for a luma component at a second level when the value of the second control flag equals to 0; and the second level is a lower level than the first level.

BRIEF DESCRIPTION OF THE DRAWINGS

Embodiments and various aspects of the present disclosure are illustrated in the following detailed description and the accompanying figures. Various features shown in the figures are not drawn to scale.

FIG. 5 shows an example pseudocode including a control variable enabling luma mapping with chroma scaling at a sequence level.

FIG. 6 shows an example pseudocode including a control variable for enabling luma mapping with chroma scaling in a picture header.

FIG. 7 shows an example pseudocode including a control variable enabling for enabling luma mapping with chroma scaling in a slice header.

FIG. 8A shows an example pseudocode including adaptive loop filter syntax in a sequence parameter set.

FIG. 8B shows an example pseudocode including adaptive loop filter syntax in a picture parameter set.

FIG. 9 shows an example pseudocode including adaptive loop filter syntax in a picture header.

FIG. 10 shows an example pseudocode including adaptive loop filter syntax in a slice header.

FIG. 11 shows an example pseudocode including sample adaptive offset syntax in a sequence parameter set.

FIG. 12 shows an example pseudocode including sample adaptive offset syntax in a picture parameter set.

FIG. 13 shows an example pseudocode including sample adaptive offset syntax in a picture header.

FIG. 14 shows an example pseudocode including sample adaptive offset syntax in a slice header.

FIG. 15 shows an example pseudocode including deblocking filter syntax in a picture parameter set.

FIG. 16 shows an example pseudocode including deblocking filter syntax in a picture header.

FIG. 17 shows an example pseudocode including deblocking filter syntax in a slice header.

FIG. 18 shows example semantics for luma mapping with chroma scaling, adaptive loop filter, and sample adaptive offset, according to some embodiments of the present disclosure.

FIG. 19 shows an example pseudocode including a novel picture parameter set for adaptive loop filter, according to some embodiments of the present disclosure.

FIG. 20 shows an example pseudocode including a novel picture header syntax for adaptive loop filter, according to some embodiments of the present disclosure.

FIG. 21 shows an example pseudocode including a novel slice header syntax for adaptive loop filter, according to some embodiments of the present disclosure.

FIG. 22A-C show an example semantics including novel flags for picture header syntax, slice header syntax, and picture parameter set of an adaptive loop filter, according to some embodiments of the present disclosure.

FIG. 23 shows an example pseudocode including a novel picture parameter set for sample adaptive offset, according to some embodiments of the present disclosure.

FIG. 24 shows an example pseudocode including a novel picture header syntax for sample adaptive offset, according to some embodiments of the present disclosure.

FIG. 25 shows an example pseudocode including a novel slice header syntax for sample adaptive offset, according to some embodiments of the present disclosure.

FIG. 26 shows an example semantics including novel flags for picture header syntax, slice header syntax, and picture parameter set of a sample adaptive offset, according to some embodiments of the present disclosure.

FIG. 27 shows an example pseudocode including a novel sequence parameter set with a sequence parameter set disabled flag for deblocking filter, according to some embodiments of the present disclosure.

FIG. 28 shows an example pseudocode including a novel picture parameter set with a sequence parameter set disabled flag for deblocking filter, according to some embodiments of the present disclosure.

FIG. 29 shows an example pseudocode including a novel picture header syntax with a sequence parameter set disabled flag for deblocking filter, according to some embodiments of the present disclosure.

FIG. 30 shows an example pseudocode including a novel slice header syntax with a sequence parameter set disabled flag for deblocking filter, according to some embodiments of the present disclosure.

FIGS. 31A and 31B show an example semantics including novel flags for picture header syntax, slice header syntax, sequence parameter set, and picture parameter set of a deblocking filter, according to some embodiments of the present disclosure.

DETAILED DESCRIPTION

Figure 1:
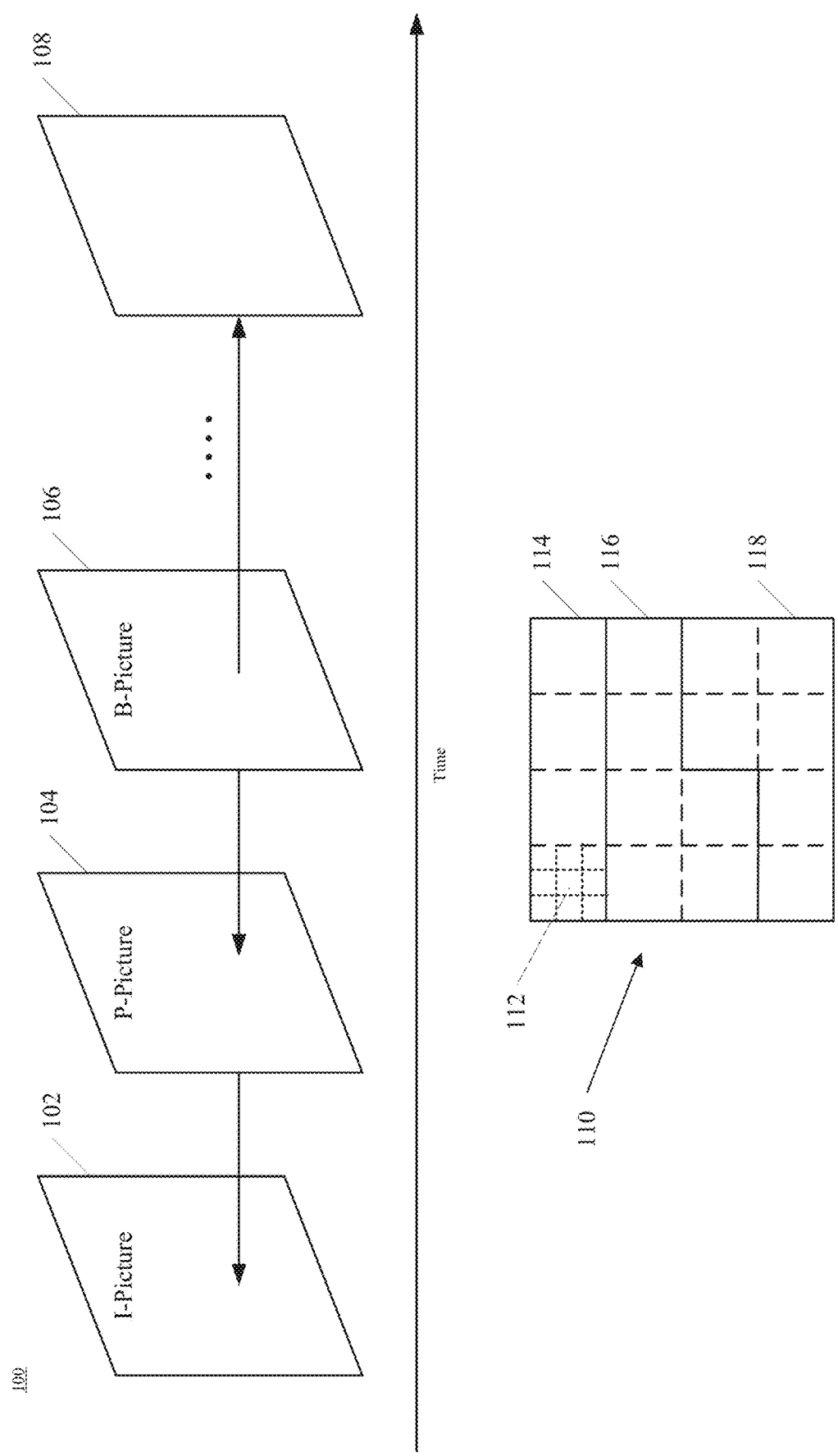
FIG. 1 illustrates a schematic diagram illustrating structures of an example video sequence, consistent with some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

The Joint Video Experts Team (JVET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

To achieve the same subjective quality as HEVC/H.265 using half the bandwidth, the JVET has been developing technologies beyond HEVC using the joint exploration model (JEM) reference software. As coding technologies were incorporated into the JEM, the JEM achieved substantially higher coding performance than HEVC.

The VVC standard has been developed recent, and continues to include more coding technologies that provide better compression performance. VVC is based on the same hybrid video coding system that has been used in modern video compression standards such as HEVC, H.264/AVC, MPEG2, H.263, etc.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture coded using a previous picture as a reference picture is referred to as a "P-picture." A picture coded using both a previous picture and a future picture as reference pictures (i.e., the reference is "bi-directional") is referred to as a "B-picture."

The present disclosure is directed to methods and apparatuses for processing video content consistent with above-described video coding standards.

FIG. 1 illustrates structures of an example video sequence 100, according to some embodiments of the present disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit. A CTU is the largest block unit and can include as many as 128×128 luma samples (plus the corresponding chroma samples depending on the chroma format). A CTU may be further partitioned into coding units (CUs) using quad-tree, binary tree, ternary tree, or a combination thereof.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which are shown in FIGS. 2A-2B and FIGS. 3A-3B. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

Figure 2A:
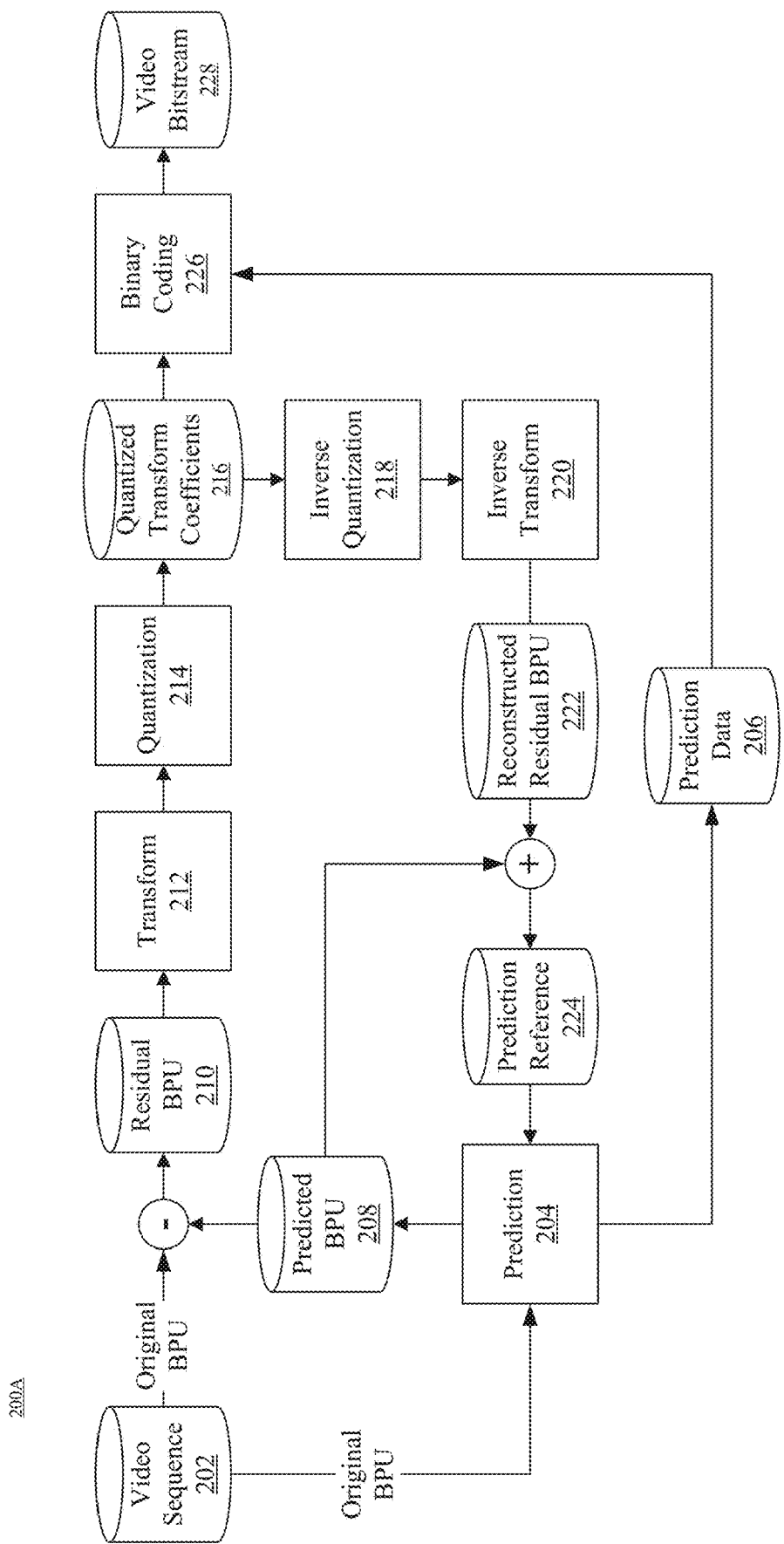
FIG. 2A illustrates a schematic diagram illustrating an exemplary encoding process of a hybrid video coding system, consistent with some embodiments of the present disclosure.
Figure 2B:
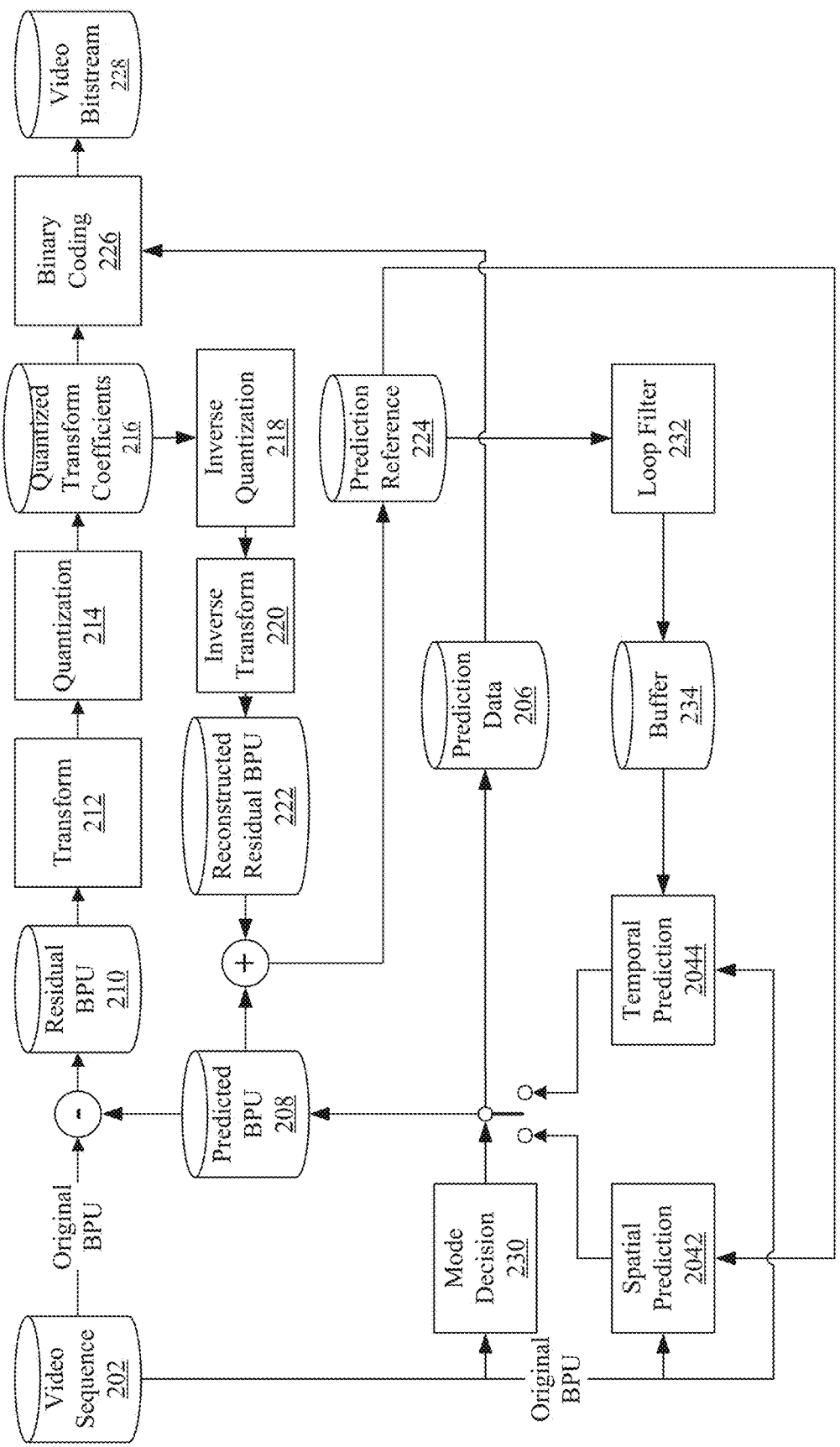
FIG. 2B illustrates a schematic diagram illustrating another exemplary encoding process of a hybrid video coding system, consistent with some embodiments of the present disclosure.

For example, at a mode decision stage (an example of which is shown in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which is shown in FIGS. 2A-2B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which is shown in FIGS. 2A-2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2A illustrates a schematic diagram of an example encoding process 200A, consistent with embodiments of the disclosure. For example, the encoding process 200A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder may record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (e.g., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (e.g., pictures 104 and 108) are at both temporal directions with respect to picture 104.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). If the inter prediction mode has been selected in the forward path, after generating prediction reference 224 (e.g., the current picture in which all BPUs have been encoded and reconstructed), the encoder can feed prediction reference 224 to loop filter stage 232, at which the encoder can apply a loop filter to prediction reference 224 to reduce or eliminate distortion (e.g., blocking artifacts) introduced by the inter prediction. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
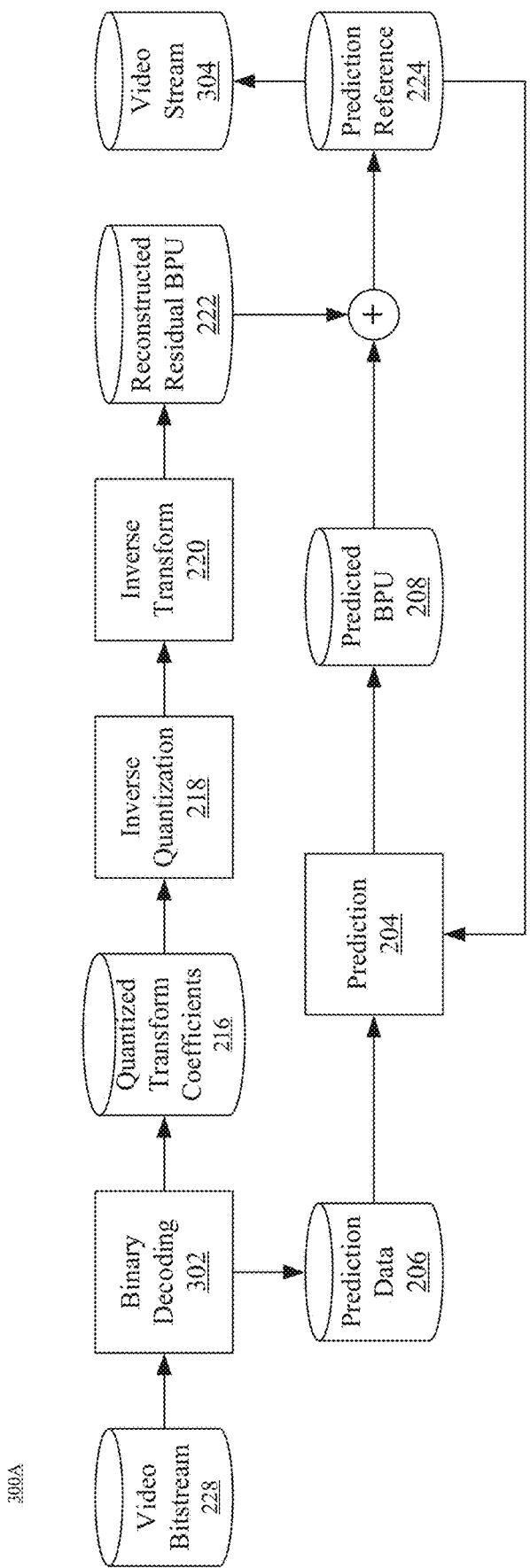
FIG. 3A illustrates a schematic diagram illustrating an exemplary decoding process of a hybrid video coding system, consistent with some embodiments of the present disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
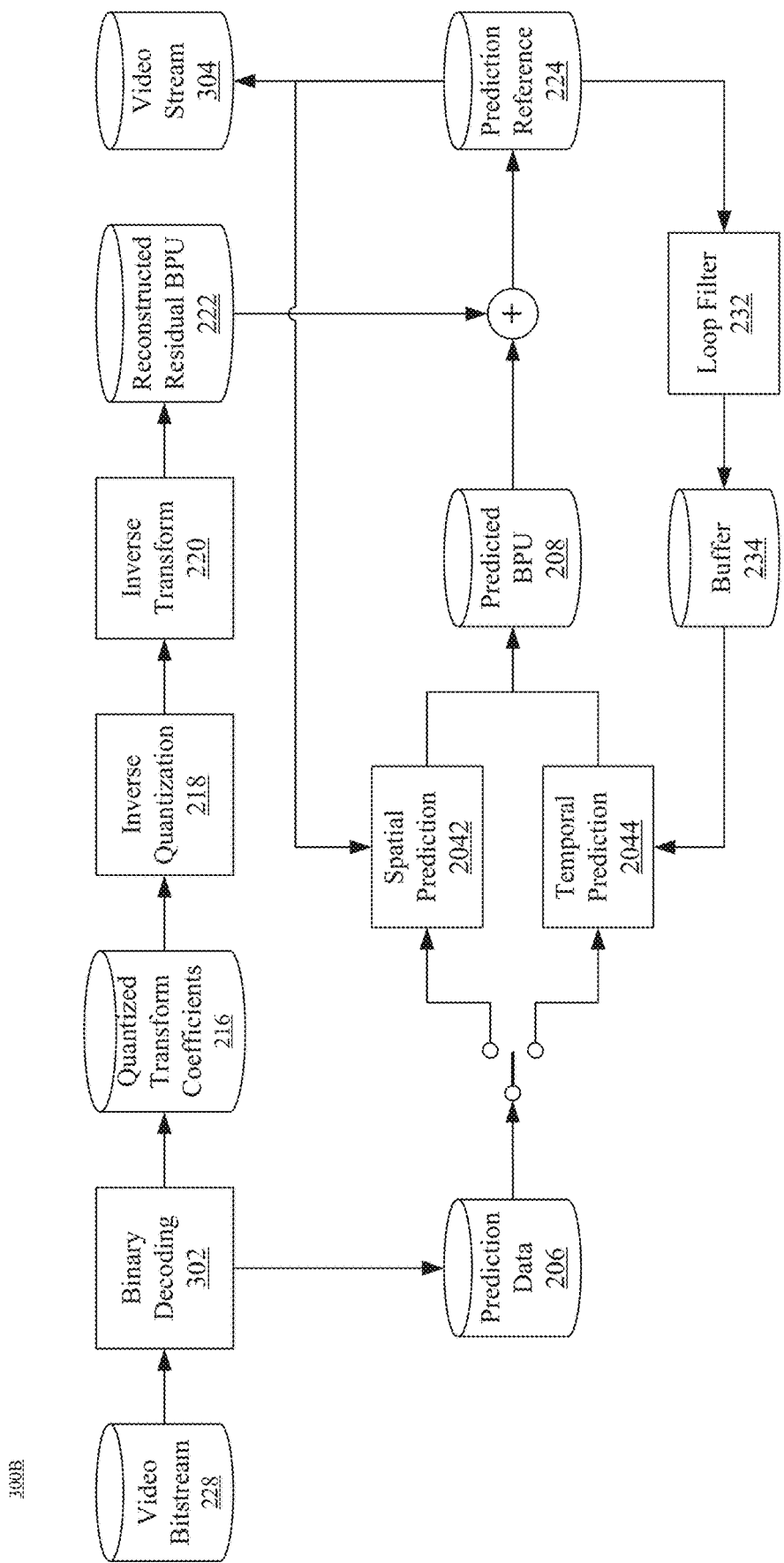
FIG. 3B illustrates a schematic diagram illustrating another exemplary decoding process of a hybrid video coding system, consistent with some embodiments of the present disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the encoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, when the prediction mode indicator of prediction data 206 indicates that inter prediction was used to encode the current BPU, prediction data can further include parameters of the loop filter (e.g., a loop filter strength).

Figure 4:
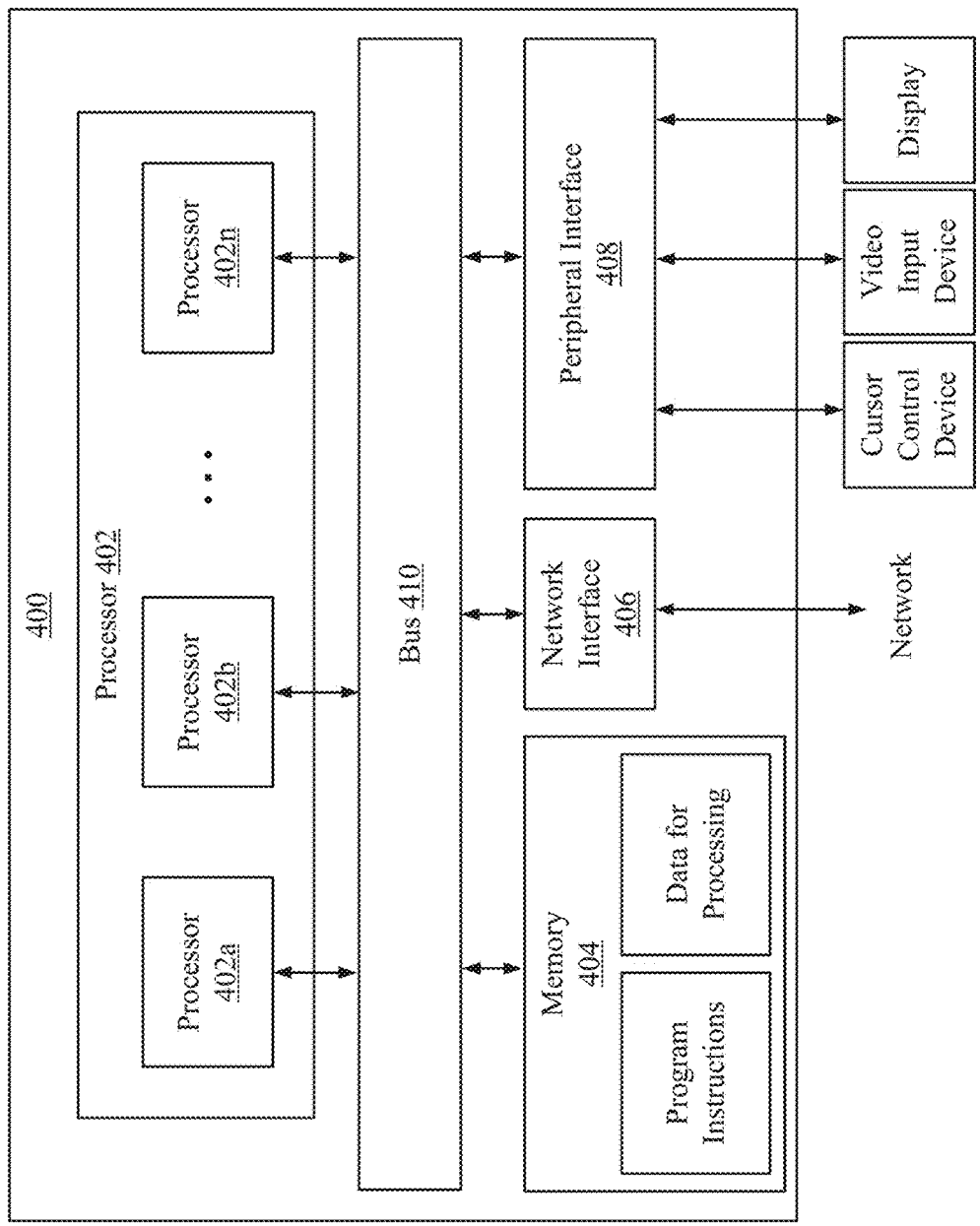
FIG. 4 illustrates a block diagram of an exemplary apparatus for encoding or decoding a video, consistent with some embodiments of the present disclosure.

FIG. 4 is a block diagram of an example apparatus 400 for encoding or decoding a video, consistent with embodiments of the disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, a near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

In VVC, a coding tool called luma mapping with chroma scaling ("LMCS") can be added as a new processing block before the loop filters. LMCS has two main components: 1) in-loop mapping of the luma component based on adaptive piecewise linear models; and 2) for the chroma components, luma-dependent chroma residual scaling is applied. The in-loop mapping of the luma component adjusts the dynamic range of the input signal by redistributing the codewords across the dynamic range to improve compression efficiency. Chroma residual scaling is designed to compensate for the interaction between the luma signal and its corresponding chroma signals.

In VVC (e.g., VVC draft 8), LMCS can be controlled at a sequence level, a picture level, or a slice level. FIG. 5 shows an example pseudocode including a control variable enabling luma mapping with chroma scaling at a sequence level. As shown in FIG. 5, when sps_lmcs_enabled_flag is equal to 1, the luma mapping with chroma scaling is used in the coded layer video sequence ("CLVS"). When sps_lmcs_enabled_flag is equal to 0, luma mapping with chroma scaling is not used in the CLVS.

FIG. 6 shows an example pseudocode including a control variable for enabling luma mapping with chroma scaling in a picture header. As shown in FIG. 6, when ph_lmcs_enabled_flag is equal to 1, the luma mapping with chroma scaling is enabled for all slices associated with the PH. When ph_lmcs_enabled_flag is equal to 0, the luma mapping with chroma scaling may be turned off for one, or more, or all slices associated with the PH. When not present, the value of ph_lmcs_enabled_flag is inferred to be equal to 0.

As shown in FIG. 6, the chroma residual scaling process can be separately controlled with a picture level flag (e.g., ph_chroma_residual_scale flag). When ph_chroma_residual_scale_flag is equal to 1, the chroma residual scaling is enabled for all slices associated with the PH. When ph_chroma_residual_scale_flag is equal to 0, the chroma residual scaling may be turned off for one, or more, or all slices associated with the PH. When ph_chroma_residual_scale_flag is not present, it is inferred to be equal to 0.

FIG. 7 shows an example pseudocode including a control variable enabling for enabling luma mapping with chroma scaling in a slice header. As shown in FIG. 7, when slice_lmcs_enabled_flag is equal to 1, the luma mapping with chroma scaling is enabled for the current slice. When slice_lmcs_enabled_flag is equal to 0, luma mapping with chroma scaling is not enabled for the current slice. When slice_lmcs_enabled_flag is not present, it is inferred to be equal to 0.

Adaptive loop filter ("ALF") is an in-loop filter that can be applied on reconstructed samples to reduce distortions of the samples to improve the coding efficiency. The filter coefficients are decided by the encoder and signaled in the bitstream.

In VVC (e.g., VVC draft 8), ALF can be controlled at the sequence level, and at one of the picture level or the slice level. The ALF may not be applied at both the picture level and the slice level. FIG. 8A shows an example pseudocode including adaptive loop filter syntax in a sequence parameter set. FIG. 8B shows an example pseudocode including adaptive loop filter syntax in a picture parameter set. FIG. 9 shows an example pseudocode including adaptive loop filter syntax in a picture header. FIG. 10 shows an example pseudocode including adaptive loop filter syntax in a slice header. As shown in FIG. 8A, variable sps_alf_enabled_flag in the sequence parameter set ("SPS") controls the ALF for the CLVS. When sps_alf_enabled_flag is equal to 1, ALF is enabled for the CLVS. When sps_alf_enabled_flag is equal to 0, ALF is disabled for the CLVS. As shown in FIG. 8B, FIG. 9, and FIG. 10, when ALF is enabled for the CLVS, it can be further controlled at the picture level by ph_alf_enabled_flag or at the slice level by slice_alf_enabled_flag. Whether it is controlled at the picture level or the slice level is decided by the flag alf_info_in_ph_flag, which is signaled in a picture parameter set ("PPS"). When ph_alf_enabled_flag is equal to 1, the ALF coefficients information is signaled in the picture header. When slice_alf_enabled_flag is equal to 1, the ALF coefficient information is signaled in slice header.

When sps_alf_enabled_flag is equal to 0, the adaptive loop filter is turned off (e.g., disabled). When sps_alf_enabled_flag equal to 1, the adaptive loop filter is enabled.

When sps_ccalf_enabled_flag is equal to 0, the cross-component adaptive loop filter is turned off. When sps_ccalf_enabled_flag equal to 1, the cross-component adaptive loop filter may be enabled.

When alf_info_in_ph_flag is equal to 1, ALF information is present in the PH syntax structure and not present in slice headers referring to the PPS that do not contain a PH syntax structure. When alf_info_in_ph_flag is equal to 0, ALF information is not present in the PH syntax structure and may be present in slice headers referring to the PPS that do not contain a PH syntax structure.

When ph_alf_enabled_flag is equal to 1, adaptive loop filter is enabled for all slices associated with the PH and may be applied to Y, Cb, or Cr colour component in the slices. When ph_alf_enabled_flag is equal to 0, adaptive loop filter may be disabled for one, or more, or all slices associated with the PH. When not present, ph_alf_enabled_flag is inferred to be equal to 0.

The variable ph_num_alf_aps_ids_luma specifies the number of ALF APSs that the slices associated with the PH refers to.

The variable ph_alf_aps_id_luma[i] specifies the adaptation_parameter_set_id of the i-th ALF APS that the luma component of the slices associated with the PH refers to.

The variable alf_luma_filter_signal_flag of the APS NAL unit having aps_params_type equal to ALF_APS and adaptation_parameter_set_id equal to ph_alf_aps_id_luma [i] should be equal to 1.

The TemporalId of the APS NAL unit having aps_params_type equal to ALF_APS and adaptation_parameter_set_id equal to ph_alf_aps_id_luma[i] should be less than or equal to the TemporalId of the picture associated with the PH.

When ph_alf_chroma_idc is equal to 0, the adaptive loop filter is not applied to Cb and Cr colour components. When ph_alf_chroma_idc is equal to 1, the adaptive loop filter is applied to the Cb colour component. When ph_alf_chroma_idc is equal to 2, the adaptive loop filter is applied to the Cr colour component. When ph_alf_chroma_idc equal to 3, the adaptive loop filter is applied to Cb and Cr colour components. When ph_alf_chroma_idc is not present, it is inferred to be equal to 0.

The variable ph_alf_aps_id_chroma specifies the adaptation_parameter_set_id of the ALF APS that the chroma component of the slices associated with the PH refers to.

The value of the alf_chroma_filter_signal_flag of the APS NAL unit having aps_params_type equal to ALF_APS and adaptation_parameter_set_id equal to ph_alf_aps_id_chroma should be equal to 1.

The TemporalId of the APS NAL unit having aps_params_type equal to ALF_APS and adaptation_parameter_set_id equal to ph_alf_aps_id_chroma should be less than or equal to the TemporalId of the picture associated with the PH.

When ph_cc_alf_cb_enabled_flag is equal to 1, cross-component filter for Cb colour component is enabled for all slices associated with the PH, and may be applied to Cb colour component in the slices. When ph_cc_alf_cb_enabled_flag is equal to 0, cross-component filter for Cb colour component may be turned off for one, or more, or all slices associated with the PH. When not present, ph_cc_alf_cb_enabled_flag is inferred to be equal to 0.

The variable ph_cc_alf_cb_aps_id specifies the adaptation_parameter_set_id of the ALF APS that the Cb colour component of the slices associated with the PH refers to.

The value of of alf_cc_cb_filter_signal_flag of the APS NAL unit having aps_params_type equal to ALF_APS and adaptation_parameter_set_id equal to ph_cc_alf_cb_aps_id should be equal to 1.

When ph_cc_alf_cr_enabled_flag is equal to 1, cross-component filter for Cr colour component is enabled for all slices associated with the PH, and may be applied to Cr colour component in the slices. When ph_cc_alf_cr_enabled_flag is equal to 0, cross-component filter for Cr colour component may be turned off for one, or more, or all slices associated with the PH. When not present, ph_cc_alf_cr_enabled_flag is inferred to be equal to 0.

The variable ph_cc_alf_cr_aps_id specifies the adaptation_parameter_set_id of the ALF APS that the Cr colour component of the slices associated with the PH refers to.

The value of alf_cc_cr_filter_signal_flag of the APS NAL unit having aps_params_type equal to ALF_APS and adaptation_parameter_set_id equal to ph_cc_alf_cr_aps_id should be equal to 1.

When slice_alf_enabled_flag is equal to 1, adaptive loop filter is enabled and may be applied to Y, Cb, or Cr colour component in a slice. When slice_alf_enabled_flag equal to 0, adaptive loop filter is turned off for all colour components in a slice. When not present, the value of slice_alf_enabled_flag is inferred to be equal to ph_alf_enabled_flag.

The variable slice_num_alf_aps_ids_luma specifies the number of ALF APSs that the slice refers to. When slice_alf_enabled_flag is equal to 1 and slice_num_alf_aps_ids_luma is not present, the value of slice_num_alf_aps_ids_luma is inferred to be equal to the value of ph_num_alf_aps_ids_luma.

The variable slice_alf_aps_id_luma [i] specifies the adaptation_parameter_set_id of the i-th ALF APS that the luma component of the slice refers to. The TemporalId of the APS NAL unit having aps_params_type equal to ALF_APS and adaptation_parameter_set_id equal to slice_alf_aps_id_luma[i] should be less than or equal to the TemporalId of the coded slice NAL unit. When slice_alf_enabled_flag is equal to 1 and slice_alf_aps_id_luma[i] is not present, the value of slice_alf_aps_id_luma[i] is inferred to be equal to the value of ph_alf_aps_id_luma[i].

The value of alf_luma_filter_signal_flag of the APS NAL unit having aps_params_type equal to ALF_APS and adaptation_parameter_set_id equal to slice_alf_aps_id_luma[i] should be equal to 1.

When slice_alf_chroma_idc is equal to 0, the adaptive loop filter is not applied to Cb and Cr colour components. When slice_alf_chroma_idc equal to 1, the adaptive loop filter is applied to the Cb colour component. When slice_alf_chroma_idc equal to 2, the adaptive loop filter is applied to the Cr colour component. When slice_alf_chroma_idc is equal to 3, the adaptive loop filter is applied to Cb and Cr colour components. When slice_alf_chroma_idc is not present, it is inferred to be equal to ph_alf_chroma_idc.

The variable slice_alf_aps_id_chroma specifies the adaptation_parameter_set_id of the ALF APS that the chroma component of the slice refers to. The TemporalId of the APS NAL unit having aps_params_type equal to ALF_APS and adaptation_parameter_set_id equal to slice_alf_aps_id_chroma should be less than or equal to the TemporalId of the coded slice NAL unit. When slice_alf_enabled_flag is equal to 1 and slice_alf_aps_id_chroma is not present, the value of slice_alf_aps_id_chroma is inferred to be equal to the value of ph_alf_aps_id_chroma.

The value of alf_chroma_filter_signal_flag of the APS NAL unit having aps_params_type equal to ALF_APS and adaptation_parameter_set_id equal to slice_alf_aps_id_chroma should be equal to 1.

When slice_cc_alf_cb_enabled_flag is equal to 0, the cross-component filter is not applied to the Cb colour component. When slice_cc_alf_cb_enabled_flag is equal to 1, the cross-component filter is enabled and may be applied to the Cb colour component. When slice_cc_alf_cb_enabled_flag is not present, it is inferred to be equal to ph_cc_alf_cb_enabled_flag.

The variable slice_cc_alf_cb_aps_id specifies the adaptation_parameter_set_id that the Cb colour component of the slice refers to.

The TemporalId of the APS NAL unit having aps_params_type equal to ALF_APS and adaptation_parameter_set_id equal to slice_cc_alf_cb_aps_id should be less than or equal to the TemporalId of the coded slice NAL unit. When slice_cc_alf_cb_enabled_flag is equal to 1 and slice_cc_alf_cb_aps_id is not present, the value of slice_cc_alf_cb_aps_id is inferred to be equal to the value of ph_cc_alf_cb_aps_id.

The value of alf_cc_cb_filter_signal_flag of the APS NAL unit having aps_params_type equal to ALF_APS and adaptation_parameter_set_id equal to slice_cc_alf_cb_aps_id should be equal to 1.

When slice_cc_alf_cr_enabled_flag is equal to 0, the cross-component filter is not applied to the Cr colour component. When slice_cc_alf_cb_enabled_flag is equal to 1, the cross-component adaptive loop filter is enabled and may be applied to the Cr colour component. When slice_cc_alf_cr_enabled_flag is not present, it is inferred to be equal to ph_cc_alf_cr_enabled_flag.

The variable slice_cc_alf_cr_aps_id specifies the adaptation_parameter_set_id that the Cr colour component of the slice refers to. The TemporalId of the APS NAL unit having aps_params_type equal to ALF_APS and adaptation_parameter_set_id equal to slice_cc_alf_cr_aps_id should be less than or equal to the TemporalId of the coded slice NAL unit. When slice_cc_alf_cr_enabled_flag is equal to 1 and slice_cc_alf_cr_aps_id is not present, the value of slice_cc_alf_cr_aps_id is inferred to be equal to the value of ph_cc_alf_cr_aps_id.

The value of alf_cc_cr_filter_signal_flag of the APS NAL unit having aps_params_type equal to ALF_APS and adaptation_parameter_set_id equal to slice_cc_alf_cr_aps_id should be equal to 1.

Sample adaptive offset ("SAO") adds an offset to the reconstructed sample to reduce the distortion of the sample. Two kind of offset modes are supported in SAO, namely an edge offset ("EO") mode and a band offset ("BO") mode. For edge offset mode, samples in a coding tree unit ("CTU") are first classified into 5 classes of which samples in 4 classes have corresponding offsets. Therefore, 4 offset values are determined by encoder, one offset for one class. The classification method and the value of offsets are signaled in bitstream at the CTU level. For band offset mode, according to the sample value, the samples in a CTU are divided into 32 bands of which samples in 4 bands have corresponding offsets. The 4 bands to be offset and the corresponding offset are signaled in the bitstream.

In VVC (e.g., VVC draft 8), same as ALF, SAO can be controlled at the sequence level, and one of the picture level or the slice level. SAO may not be controlled at both the picture level and the slice level. FIG. 11 shows an example pseudocode including sample adaptive offset syntax in a sequence parameter set. FIG. 12 shows an example pseudocode including sample adaptive offset syntax in a picture parameter set. FIG. 13 shows an example pseudocode including sample adaptive offset syntax in a picture header. FIG. 14 shows an example pseudocode including sample adaptive offset syntax in a slice header. As shown in FIG. 11, variable sps_sao_enabled_flag in the SPS controls the SAO for the CLVS. When sps_sao_enabled_flag is equal to 1, SAO is enabled for the CLVS. When sps_sao_enabled_flag is equal to 0, SAO is turned off for the CLVS.

As shown in FIG. 12, FIG. 13 and FIG. 14, when SAO is enabled for the CLVS, it can be further controlled at the picture level by ph_sao_luma_enabled_flag/ph_sao_chroma_enabled_flag or the slice level by slice_sao_luma_flag/slice_sap_chroma_flag. Whether it is controlled at the picture level or the slice level is decided by the flag sao_info_in_ph_flag which is signaled in the PPS.

When sps_sao_enabled_flag is equal to 1, the sample adaptive offset process is applied to the reconstructed picture after the deblocking filter process. When sps_sao_enabled_flag is equal to 0, the sample adaptive offset process is not applied to the reconstructed picture after the deblocking filter process.

When sao_info_in_ph_flag is equal to 1, SAO filter information is present in the PH syntax structure and not present in slice headers referring to the PPS that do not contain a PH syntax structure. When sao_info_in_ph_flag is equal to 0, SAO filter information is not present in the PH syntax structure and may be present in slice headers referring to the PPS that do not contain a PH syntax structure.

When ph_sao_luma_enabled_flag is equal to 1, SAO is enabled for the luma component in all slices associated with the PH. When ph_sao_luma_enabled_flag is equal to 0, SAO for the luma component may be turned off for one, or more, or all slices associated with the PH. When ph_sao_luma_enabled_flag is not present, it is inferred to equal to 0.

When ph_sao_chroma_enabled_flag is eequal to 1, that SAO is enabled for the chroma component in all slices associated with the PH. When ph_sao_chroma_enabled_flag is equal to 0, SAO for chroma component may be turned off for one, or more, or all slices associated with the PH. When ph_sao_chroma_enabled_flag is not present, it is inferred to be equal to 0.

When slice_sao_luma_flag is equal to 1, SAO is enabled for the luma component in the current slice. When slice_sao_luma_flag is equal to 0, SAO is turned off for the luma component in the current slice. When slice_sao_luma_flag is not present, it is inferred to be equal to ph_sao_luma_enabled_flag.

When slice_sao_chroma_flag is equal to 1, SAO is enabled for the chroma component in the current slice. When slice_sao_chroma_flag is equal to 0, SAO is turned off for the chroma component in the current slice. When slice_sao_chroma_flag is not present, it is inferred to be equal to ph_sao_chroma_enabled_flag.

Deblocking filter ("DBF") is a filter applied on the boundaries of the blocks to reduce the block artifacts. In VVC (e.g., VVC draft 8), DBF disabled flag and parameters are signaled in PPS. In addition, an overriding enabled flag deblocking_filter_override_enabled_flag is also signaled to indicate whether the DBF disabled flag and parameters can be overridden in low level. If so, a flag dbf_info_in_ph_flag is signaled to indicate whether DBF disabled flag and parameters are overridden in the picture header or the slice header.

FIG. 15 shows an example pseudocode including deblocking filter syntax in a picture parameter set. FIG. 16 shows an example pseudocode including deblocking filter syntax in a picture header. FIG. 17 shows an example pseudocode including deblocking filter syntax in a slice header. As shown in FIG. 15, FIG. 16, and FIG. 17, if the DBF disabled flag and parameters are overridden in picture header, a picture level DBF disabled flag and DBF parameters can be signaled in picture header. If the DBF disabled flag and parameters are overridden in slice header, a slice level DBF disabled flag and DBF parameters can be signaled in slice header.

When deblocking_filter_control_present_flag is equal to 1, the deblocking filter control syntax elements is present in the PPS. When deblocking_filter_control_present_flag is equal to 0, deblocking filter control syntax elements is absent in the PPS.

When deblocking_filter_override_enabled_flag is equal to 1, ph_deblocking_filter_override_flag is present in the PHs referring to the PPS, or slice_deblocking_filter_override_flag is present in the slice headers referring to the PPS. When deblocking_filter_override_enabled_flag is equal to 0, ph_deblocking_filter_override_flag is absent in PHs referring to the PPS or slice_deblocking_filter_override_flag is absent in slice headers referring to the PPS. When not present, the value of deblocking_filter_override_enabled_flag is inferred to be equal to 0.

When pps_deblocking_filter_disabled_flag is equal to 1, the operation of deblocking filter is not applied for slices referring to the PPS in which slice_deblocking_filter_disabled_flag is not present. When pps_deblocking_filter_disabled_flag is equal to 0, the operation of the deblocking filter is applied for slices referring to the PPS in which slice_deblocking_filter_disabled_flag is not present. When not present, the value of pps_deblocking_filter_disabled_flag is inferred to be equal to 0.

When ph_deblocking_filter_override_flag is equal to 1, deblocking parameters are present in the PH. When ph_deblocking_filter_override_flag is equal to 0, deblocking parameters are not present in the PH. When not present, the value of ph_deblocking_filter_override_flag is inferred to be equal to 0.

When ph_deblocking_filter_disabled_flag is equal to 1, the operation of the deblocking filter is not applied for the slices associated with the PH. When ph_deblocking_filter_disabled_flag equal to 0,] ] the operation of the deblocking filter is applied for the slices associated with the PH. When ph_deblocking_filter_disabled_flag is not present, it is inferred to be equal to pps_deblocking_filter_disabled_flag.

When slice_deblocking_filter_override_flag is equal to 1, deblocking parameters are present in the slice header. When slice_deblocking_filter_override_flag is equal to 0, deblocking parameters are not present in the slice header. When not present, the value of slice_deblocking_filter_override_flag is inferred to be equal to ph_deblocking_filter_override_flag.

When slice_deblocking_filter_disabled_flag is equal to 1, the operation of the deblocking filter is not applied for the current slice. When slice_deblocking_filter_disabled_flag is equal to 0, the operation of the deblocking filter is applied for the current slice. When slice_deblocking_filter_disabled_flag is not present, it is inferred to be equal to ph_deblocking_filter_disabled_flag.

There are many issues with the current design of the VVC. First, LMCS can be controlled in the CLVS level, the picture level, and the slice level. When a higher level enabled flag enables LMCS, the lower level can turn it off. In other words, the enabled flag being equal to 1 at a given level does not mean that LMCS must be enabled, since a lower level enabled flag may turn it off. Similarly, when the SPS enabled flag enables ALF and SAO, the picture level or the slice level enabled flag may turn them off. As a result, the current semantics is not accurate.

Moreover. When ph_lmcs_enabled_flag is equal to 1, ph_chroma_residual_scale_flag can still turn off (e.g., disable) chroma scaling for current picture. As a result, ph_lmcs_enabled_flag being equal to 1 does not mean that chroma scaling must be enabled. Therefore, the current semantics is not accurate.

Another issue is with syntax consistency. There are several inconsistencies between ALF/SAO and LMCS syntax. LMCS can be controlled in three levels, namely SPS, PH and SH. When it is enabled in a higher level, the lower level can turn it off. When it is turned off in a higher level, a lower level may not enable it. For ALF and SAO, however, they can only be controlled at two levels, namely SPS and one of PH or SH. The decision of PH level controlling or SH level controlling for ALF and SAO is decided by a flag in the PPS. As a result, the controlling mechanism is different between LMCS and ALF/SAO.

In addition, when ALF is controlled in PH and enabled, the parameter information of ALF is signaled in PH. When ALF is controlled in SH and enabled, the parameter information of ALF is signaled in SH. Therefore, for ALF, when the control is at the slice level, different slices may have different ALF parameters. In contrast, for LMCS, SH can only enable or turn off (e.g., disable) but cannot signal the parameter information when enabled. In other words, LMCS parameters needs to be the same for all the slices (that enable LMCS) within the same picture. This is another inconsistency between ALF and LMCS.

A third issue is with the deblocking filter syntax. There is no SBS disabled flag to disable DBF for the whole CLVS. Moreover, the semantics of pps_deblocking_filter_disabled_flag and ph_deblocking_filter_disabled_flag are not correct. In VVC (e.g., VVC draft 8), pps_deblocking_filter_disabled_flag being equal to 1 (or 0) specifies that the operation of deblocking filter is not applied (or applied) for slices referring to the PPS in which slice_deblocking_filter_disabled_flag is not present. However, ph_deblocking_filter_disabled_flag can override the pps_deblocking_filter_disabled_flag, and thus the semantics of pps_deblocking_filter_disabled_flag is not accurate. Additionally, according to VVC (e.g., VVC draft 8), ph_deblocking_filter_disabled_flag being equal to 1 (or 0) specifies that the operation of the deblocking filter is not applied (or applied) for the slices associated with the PH. When ph_deblocking_filter_disabled_flag is not present, it is inferred to be equal to pps_deblocking_filter_disabled_flag. However, in the case that slice_deblocking_filter_disabled_flag overrides pps_deblocking_filter_disabled_flag, ph_deblocking_filter_disabled_flag is not present, and thus it is inferred to be equal to pps_deblocking_filter_disabled_flag. But since pps_deblocking_filter_disabled_flag is overridden by slice_deblocking_filter_disabled_flag, the value of pps_deblocking_filter_disabled_flag may be not applicable to the that slice. Thus, the semantics of ph_deblocking_filter_disabled_flag is incorrect.

Embodiments of the present disclosure provides a method to combat the issues described above. In some embodiments, semantics can be modified based on the consideration that low level enabled flag of LMCS, ALF and SAO may turn off (e.g., disable) LMCS, ALF and SAO when high level enabled flag enables them, and chroma scaling may be turned off when LMCS flag is enabled. FIG. 18 shows example semantics for luma mapping with chroma scaling, adaptive loop filter, and sample adaptive offset, according to some embodiments of the present disclosure. As shown in FIG. 18, changes from the previous VVC are shown in bold, with proposed deleted syntax being further shown in strikethrough.

In some embodiments, semantics can be modified in the following manner: when ALF or SAO is enabled in a higher level, a lower level can turn them off. When ALF or SAO is turned off in a higher level, a lower level may not enable them. Moreover, for ALF, when it is controlled in SH, it can only be enabled or disabled, and slice specific ALF parameters may not be signaled in SH. As a result, all the slices in a picture can share the same ALF parameters.

FIG. 19 shows an example pseudocode including a novel picture parameter set for adaptive loop filter, according to some embodiments of the present disclosure. FIG. 20 shows an example pseudocode including a novel picture header syntax for adaptive loop filter, according to some embodiments of the present disclosure. FIG. 21 shows an example pseudocode including a novel slice header syntax for adaptive loop filter, according to some embodiments of the present disclosure. As shown in FIG. 19, FIG. 20, and FIG. 21, changes from the previous VVC are shown in bold, with proposed deleted syntax being further shown in strikethrough. As shown in FIG. 19, FIG. 20, and FIG. 21, PPS level signaling is simplified by removing alf_info_in_ph_flag and cleaning up the ALF parameter signaling syntax in the slice header.

FIG. 22 shows an example semantics including novel flags for picture header syntax, slice header syntax, and picture parameter set of an adaptive loop filter, according to some embodiments of the present disclosure. As shown in FIG. 22, changes from the previous VVC are shown in bold, with proposed deleted syntax being further shown in strikethrough. It is appreciated that the semantics shown in FIG. 22 can be applied to the pseudocode in FIG. 19, FIG. 20, or FIG. 21.

FIG. 23 shows an example pseudocode including a novel picture parameter set for sample adaptive offset, according to some embodiments of the present disclosure. FIG. 24 shows an example pseudocode including a novel picture header syntax for sample adaptive offset, according to some embodiments of the present disclosure. FIG. 25 shows an example pseudocode including a novel slice header syntax for sample adaptive offset, according to some embodiments of the present disclosure. As shown in FIG. 23, FIG. 24, and FIG. 25, changes from the previous VVC are shown in bold, with proposed deleted syntax being further shown in strikethrough. As shown in FIG. 23, FIG. 24, and FIG. 25, PPS level signaling is simplified by removing sao_info_in_ph_flag.

FIG. 26 shows an example semantics including novel flags for picture header syntax, slice header syntax, and picture parameter set of a sample adaptive offset, according to some embodiments of the present disclosure. As shown in FIG. 26, changes from the previous VVC are shown in bold, with proposed deleted syntax being further shown in strikethrough. It is appreciated that the semantics shown in FIG. 26 can be applied to the pseudocode in FIG. 23, FIG. 24, or FIG. 25.

In some embodiments, an SPS disable flag can be added for DBF.

In some embodiments, since pps_deblocking_filter_disabled_flag may be overriden by ph_deblocking_filter_disabled_flag or slice_deblocking_filter_disabled_flag, pps_deblocking_filter_disabled_flag is only applicable when overriding mechanism is disabled (e.g., both ph_deblocking_filter_disabled_flag and slice_deblocking_filter_disabled_flag are not present), and ph_deblocking_filter_disabled_flag is only applicable when ph_deblocking_filter_disabled_flag overrides pps_deblocking_filter_disabled_flag (e.g., ph_deblocking_filter_disabled_flag is present, but slice_deblocking_filter_disabled_flag is not present).

FIG. 27 shows an example pseudocode including a novel sequence parameter set with a sequence parameter set disabled flag for deblocking filter, according to some embodiments of the present disclosure. FIG. 28 shows an example pseudocode including a novel picture parameter set with a sequence parameter set disabled flag for deblocking filter, according to some embodiments of the present disclosure. FIG. 29 shows an example pseudocode including a novel picture header syntax with a sequence parameter set disabled flag for deblocking filter, according to some embodiments of the present disclosure. FIG. 30 shows an example pseudocode including a novel slice header syntax with a sequence parameter set disabled flag for deblocking filter, according to some embodiments of the present disclosure. As shown in FIG. 27, FIG. 28, FIG. 29, and FIG. 30, changes from the previous VVC are shown in bold, with proposed deleted syntax being further shown in strikethrough.

FIG. 31A/B shows an example semantics including novel flags for picture header syntax, slice header syntax, sequence parameter set, and picture parameter set of a deblocking filter, according to some embodiments of the present disclosure. As shown in FIG. 26, changes from the previous VVC are shown in bold, with proposed deleted syntax being further shown in strikethrough. It is appreciated that the semantics shown in FIG. 31A/B can be applied to the pseudocode in FIG. 27, FIG. 28, FIG. 29, or FIG. 30.

Figure 32:
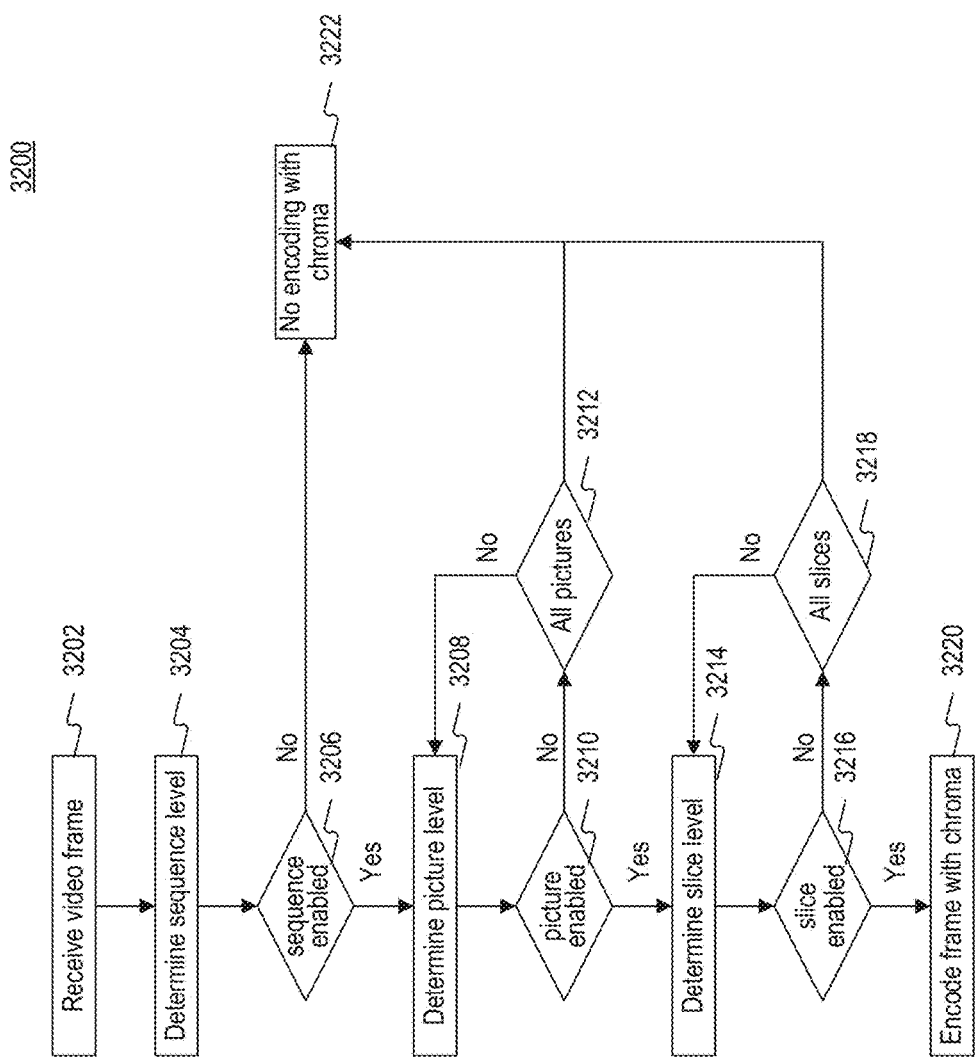
FIG. 32 is a flow chart depicting an exemplary process for determining luma mapping with chroma scaling (LMCS) for a video frame, according to some embodiments of the present disclosure.

FIG. 32 is a flow chart depicting an exemplary process for determining luma mapping with chroma scaling (LMCS), consistent with the present disclosure. Process 3200 may be performed by a codec (e.g., an encoder in FIG. 2A-2B or a decoder in FIGS. 3A-3B). For example, the codec can be implemented as one or more software or hardware components of an apparatus (e.g., apparatus 400 in FIG. 4) for determining LMCS, such as a processor (e.g., processor 402) of the apparatus. The method can include the following steps.

In step 3202, apparatus 400 receives video frame or frames. A video as used herein may refer to a temporal sequence of "frames" (e.g., static images or pictures) capturing the visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

In step 3204, apparatus 400 determines a control flag for the video frame at the sequence level. In some embodiments, a video frame may include a sequence of pictures, and each picture may include one or more slices. The control flag for the sequence may be an indication of a status of for all pictures in the sequence. In some embodiments, the control flag may be an indication of whether the video frame is to be encoded with luma mapping with chroma scaling (LMCS). The control flag of the sequence may be an example of a first control flag. By way of example depicted in FIG. 18, sps_lmcs_enabled_flag may be a control flag for LMCS at the sequence level. In some embodiments, sps_lmcs_enabled_flag may have a value of "1" or "0."

In step 3206, apparatus 400 checks for the value of the control flag for LMCS at the sequence level to determine if LMCS is enabled at the sequence level. If LMCS is not enabled at the sequence level, step 3206 is "No," and process 3200 proceeds to step 3222. When LMCS is not enabled at the sequence level, LMCS is also not enabled for all pictures and all slices of the video frame of the sequence. In some embodiments, step 3206 is "No" when sps_lmcs_enabled_flag has a value of "0." If LMCS is enabled at the sequence level, step 3206 is "Yes," and process 3200 proceeds to step 3208. When LMCS is enabled at the sequence level, the all pictures in the sequence may be enabled. In some embodiments, step 3206 is "Yes" when sps_lmcs_enabled_flag has a value of "1."

In step 3208, apparatus 400 determines a control flag for the video frame at picture level for a picture in the sequence. In some embodiments, a picture of the video frame within a sequence may include one or more slices. The control flag for the picture may be an indication of a status of for all slices in the picture. In some embodiments, the control flag may be an indication of whether a picture of the video frame is to be encoded with luma mapping with chroma scaling (LMCS). The control flag of the picture may be an example of a second control flag. By way of example depicted in FIG. 18, ph_lmcs_enabled_flag may be a control flag for LMCS at the picture level. In some embodiments, the control flag at the picture level is present in the picture header. In some embodiments, ph_lmcs_enabled_flag may have a value of "1" or "0."

In step 3210, apparatus 400 checks for the value of the control flag for LMCS at the picture level to determine if LMCS is enabled at the picture level. If LMCS is not enabled at picture level, step 3210 is "No," and process 3200 proceeds to step 3212. When LMCS is not enabled at the picture level, LMCS also not enabled for all slices of that picture of the video frame. In some embodiments, step 3210 is "No" when ph_lmcs_enabled_flag has a value of "0." If LMCS is enabled at the picture level, step 3210 "Yes," and process 3200 proceeds to step 3214. When LMCS is enabled at the picture level, then all slices in the picture may be enabled. In some embodiments, step 3210 is "Yes" when ph_lmcs_enabled_flag has a value of "1."

In some additional or alternative embodiments, apparatus 400 may, in response to determining LMCS is enabled for the picture level (step 3210—Yes), check for value of a third control flag indicating whether chroma scaling (CS) is enabled at the picture level for the video frame. As depicted in FIG. 18, ph_chroma_residual_scale_flag may be an example of the third control flag. In some embodiments, CS is enabled when ph_chroma_residual_scale_flag equals to 1, and CS is not enabled when ph_chroma_residual_scale_flag equals to 0.

In step 3212, apparatus 400 checks if the picture is the last picture in the sequence. If step 3212 is "No," apparatus 400 proceeds to step 3208 to determine the control flag for the video frame at the picture for the next picture in the sequence. Regardless of whether step 3212 is "Yes" or "No," process 3200 also proceeds to step 3222.

In step 3214, apparatus 400 determines a control flag for the video frame at the slice level for slice in the picture as determined in step 3208. The control flag for the slice may be an indication of a status for a specific slice in the picture. In some embodiments, the control flag may be an indication of whether a slice of the picture in a video frame is to be encoded with luma mapping with chroma scaling (LMCS). The control flag of the slice may be an example of a fourth control flag. By way of example depicted in FIG. 18, slice_lmcs_enabled_flag may be a control flag for LMCS at the slice level. In some embodiments, slice_lmcs_enabled_flag may have a value of "1" or "0."

In step 3216, apparatus 400 checks for the value of the control flag for LMCS at the slice level to determine if LMCS is enabled at the slice level. If LMCS is not enabled at slice level, step 3216 is "No," and process 3200 proceeds to step 3218. In some embodiments, step 3216 is "No" when slice_lmcs_enabled_flag has a value of "0." If LMCS is enabled at the slice level, step 3216 "Yes," and process 3200 proceeds to step 3220. In some embodiments, step 3216 is "Yes" when slice_lmcs_enabled_flag has a value of "1."

In step 3218, apparatus 400 checks if the slice is the last slice in the picture. If step 3218 is "No," apparatus 400 proceeds to step 3214 to determine the control flag for the video frame at the slice for the next slice in the picture. Regardless of whether step 3218 is "Yes" or "No," process 3200 also proceeds to step 3222.

In step 3220, apparatus 400 encodes the slice, picture, and/or sequence of the video frame with luma mapping (LM) enabled, and allowing chroma scaling to be enabled. In some embodiments, in response to the second flag indicating the LMCS is enabled at the picture level, luma mapping (LM) is enabled and the CS can be enabled at the slice level when the slice_lmcs_enabled_flag equals to 1.

In step 3222, apparatus 400 encodes the slice, picture, and/or sequence of the video frame with luma mapping and chroma scaling not enabled.

Figure 33:
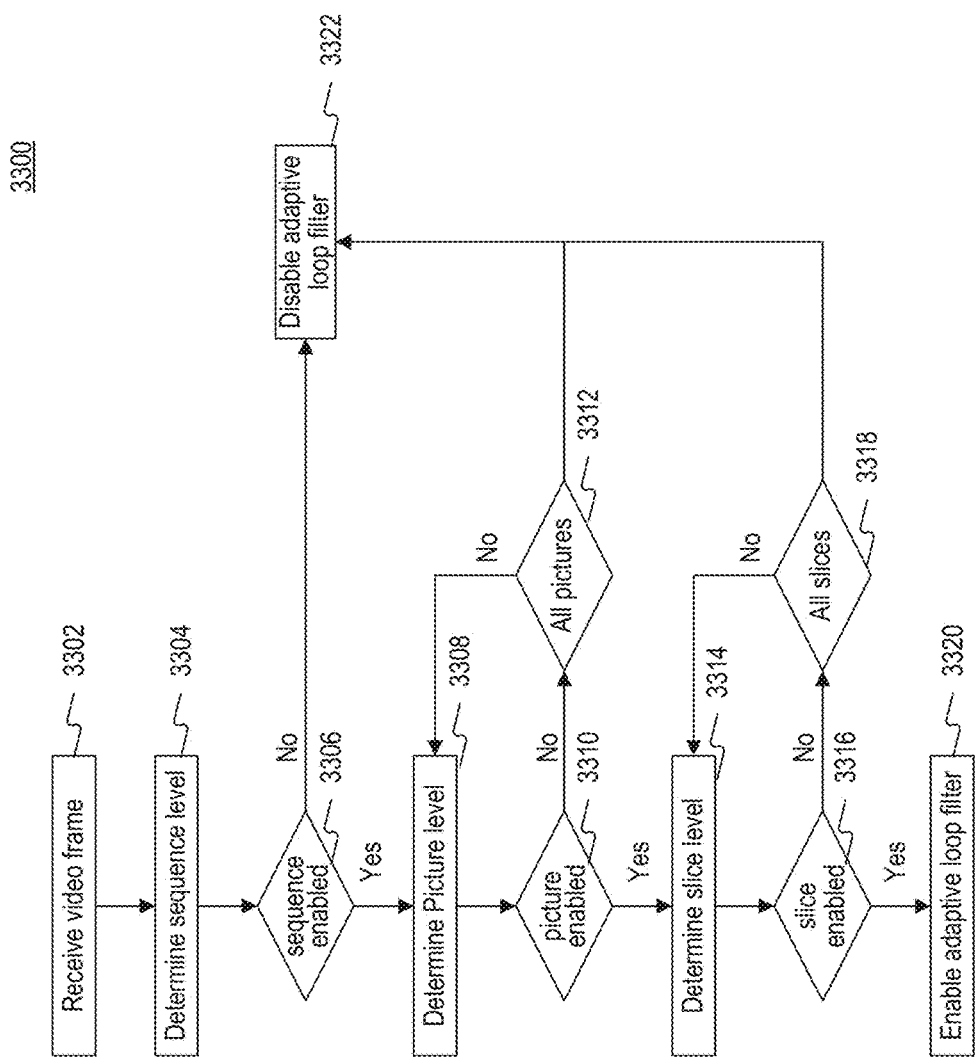
FIG. 33 is a flow chart depicting an exemplary process for adaptive loop filter (ALF) for a video frame, according to some embodiments of the present disclosure.

FIG. 33 is a flow chart depicting an exemplary process for determining coding a video frame using adaptive loop filter (ALF), consistent with the present disclosure. Process 3300 may be performed by apparatus 400 and its sub-components, such as processor 3102.

In step 3302, apparatus 400 receives video frame or frames.

In step 3304, apparatus 400 determines a control flag for the video frame at the sequence level. In some embodiments, the control flag may be an indication of whether the video frame is to be encoded using adaptive loop filter (ALF). The control flag of the sequence may be an example of a first control flag. By way of example depicted in FIG. 18, sps_alf_enabled_flag may be a control flag for ALF at the sequence level. In some embodiments, sps_alf_enabled_flag may have a value of "1" or "0." In some embodiments, if value of sps_alf_enabled_flag is not specified or missing, the default value may be "0."

In step 3306, apparatus 400 checks for the value of the control flag for ALF at the sequence level to determine if ALF is enabled at the sequence level. If ALF is not enabled at sequence level, step 3306 is "No," and process 3300 proceeds to step 3322. When ALF is not enabled at the sequence level, ALF also not enabled for all pictures and all slices of the video frame. In some embodiments, step 3306 is "No" when sps_alf_enabled_flag has a value of "0." If ALF is enabled at sequence level, step 3306 is "Yes," and process 3300 proceeds to step 3308. When ALF is enabled at the sequence level, then all pictures in the sequence may be enabled. In some embodiments, step 3306 is "Yes" when sps_alf_enabled_flag has a value of "1."

In step 3308, apparatus 400 determines a control flag for the video frame at picture level for a picture in the sequence. In some embodiments, the control flag may be an indication of whether a picture of the video frame is to be encoded using adaptive loop filter (ALF). The control flag of the picture may be an example of a second control flag. By way of example depicted in FIG. 22A and FIG. 22B, ph_alf_enabled_flag may be a control flag for ALF at the picture level. In some embodiments, the control flag at the picture level is present in the picture header. In some embodiments, ph_alf_enabled_flag may have a value of "1" or "0." In some embodiments, if value of ph_alf_enabled_flag is not specified or missing, the default value may be "0."

In step 3310, apparatus 400 checks for the value of the control flag for ALF at the picture level to determine if ALF is enabled at the picture level. If ALF is not enabled at the picture level, step 3310 is "No," and process 3300 proceeds to step 3312. When ALF is not enabled at the picture level, ALF also not enabled for all slices of that picture of the video frame. In some embodiments, step 3310 is "No" when ph_alf_enabled_flag has a value of "0." If ALF is enabled at picture level, step 3310 "Yes," and process 3300 proceeds to step 3314. When ALF is enabled at the picture level then all pictures in the sequence may be enabled. In some embodiments, step 3310 is "Yes" when ph_alf_enabled_flag has a value of "1."

In some additional or alternative embodiments, the second control flag may be a control flag for either the picture level or the slice level, depending on a third control flag signaled at a picture parameter set (PPS).

In some additional or alternative embodiments, apparatus 400 may, in response to determining ALF is enabled for the picture level (step 3310—Yes), check for value of a fourth control flag indicating whether Cross Component Adaptive loop filter (CCALF) enabled at the picture level for the video frame for Cb color component. As depicted in FIG. 22A, ph_cc_alf_cb_enabled_flag may be an example of the fourth control flag.

In some additional or alternative embodiments, apparatus 400 may, in response to determining ALF is enabled for the picture level (step 3310—Yes), check for value of a fifth control flag indicating whether Cross Component Adaptive loop filter (CCALF) enabled at the picture level for the video frame for Cr color component. As depeicted in FIG. 22A, ph_cc_alf_cr_enabled_flag may be an example the fifth control flag.

In step 3312, apparatus 400 checks if the picture is the last picture in the sequence. If step 3312 is "No," apparatus 400 proceeds to step 3308 to determine the control flag for the video frame at the picture level for the next picture in the sequence. Regardless of whether step 3312 is "Yes" or "No," process 3300 also proceeds to step 3322.

In step 3314, apparatus 400 determines a control flag for the video frame at the slice level for slice in the picture as determined in step 3308. The control flag for the slice may be an indication of a status for a specific slice in the picture. In some embodiments, the control flag may be an indication of whether a slice of the picture in a video frame is to be encoded using adaptive loop filter (ALF). The control flag of the slice may be an example of a third control flag. By way of example depicted in FIG. 22A and FIG. 22B, slice_alf_enabled_flag may be a control flag for AFL at the slice level. In some embodiments, slice_alf_enabled_flag may have a value of "1" or "0." In some embodiments, if value of slice_alf_enabled_flag is not specified or missing, the default value may be "0."

In step 3316, apparatus 400 checks for the value of the control flag for ALF at the slice level to determine if ALF is enabled at the slice level. If ALF is not enabled at the slice level, step 3310 is "No," and process 3300 proceeds to step 3318. In some embodiments, step 3316 is "No" when slice_alf_enabled_flag has a value of "0." If ALF is enabled at picture level, step 3316 "Yes," and process 3300 proceeds to step 3320. In some embodiments, step 3316 is "Yes" when slice_alf_enabled_flag has a value of "1."

In step 3318, apparatus 400 checks if the slice is the last slice in the picture. If step 3318 is "No," apparatus 400 proceeds to step 3314 to determine the control flag for the video frame at the slice for the next slice in the picture.

Regardless of whether step 3318 is "Yes" or "No," process 3300 also proceeds to step 3322.

In step 3320, apparatus 400 encodes the slice, picture, and/or sequence of the video frame using adaptive loop filter (ALF). In some embodiments, when AFL is enabled, color components Y, Cb, or Cr is enabled.

In step 3322, apparatus 400 encodes the slice, picture, and/or sequence of the video frame with adaptive loop filter (ALF) not enabled.

Figure 34:
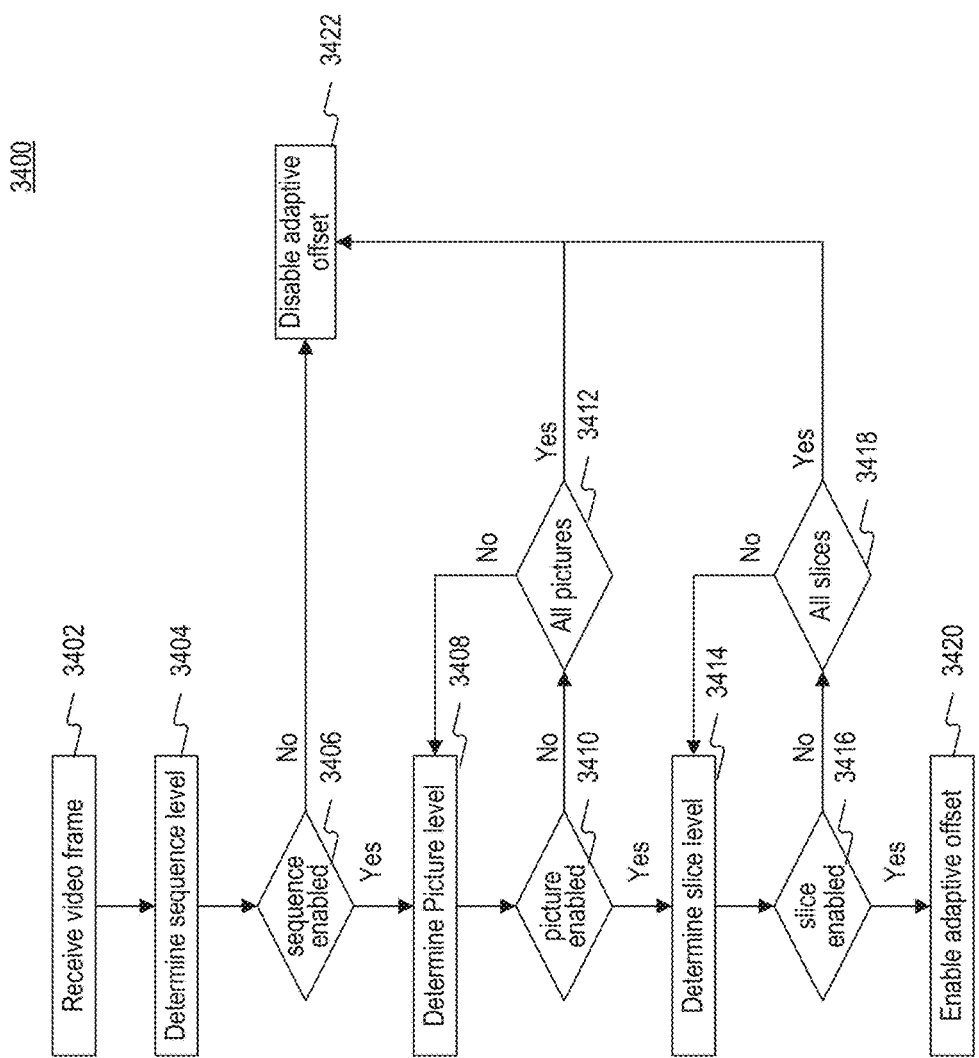
FIG. 34 is a flow chart depicting an exemplary process for determining sample adaptive offset (SAO) for a video frame, according to some embodiments of the present disclosure.

FIG. 34 is a flow chart depicting an exemplary process for determining coding a video frame using sample adaptive offset (SAO), consistent with the present disclosure. Process 3400 may be performed by apparatus 400 and its sub-components, such as processor 3102.

In step 3402, apparatus 400 receives video frame or frames.

In step 3404, apparatus 400 determines a control flag for the video frame at the sequence level. In some embodiments, the control flag may be an indication of whether the video frame is to be encoded using sample adaptive offset (SAO). The control flag of the sequence may be an example of a first control flag. By way of example depicted in FIG. 26, sps_sao_enabled_flag may be a control flag for ALF at the sequence level. In some embodiments, sps_sao_enabled_flag may have a value of "1" or "0."

In step 3406, apparatus 400 checks for the value of the control flag for SAO at the sequence level to determine if SAO is enabled at the sequence level. If SAO is not enabled at the sequence level, step 3406 is "No," and process 3400 proceeds to step 3422. When SAO is not enabled at the sequence level, SAO is also not enabled for all pictures and all slices of the video frame. In some embodiments, step 3406 is "No" when sps_sao_enabled_flag has a value of "0." If SAO is enabled at sequence level, step 3406 is "Yes," and process 3400 proceeds to step 3408. When SAO is enabled at the sequence level, then all pictures in the sequence may be enabled. In some embodiments, step 3406 is "Yes" when sps_sao_enabled_flag has a value of "1."

In step 3408, apparatus 400 determines a control flag for the video frame at the picture level for a picture in the sequence. The control flag for the picture may be an indication of a status of for all slices in the picture. In some embodiments, the control flag may be an indication of whether a picture of the video frame is to be encoded using sample adaptive offset (SAO). The control flag of the picture may be an example of a second control flag. By way of example depicted in FIG. 26, one of ph_sao_luma_enabled_flag or ph_sao_chroma_enabled_flag, or both, may be a control flag for SAO at the picture level. In some embodiments, the control flag at the picture level is present in the picture header. In some embodiments, ph_sao_luma_enabled_flag or ph_sao_chroma_enabled_flag may have a value of "1" or "0." In some embodiments, if value of ph_sao_luma_enabled_flag or ph_sao_chroma_enabled_flag is not specified or missing, the default value may be "0." A person or ordinary skill in the art will now appreciate that process 3400 depicted in FIG. 34 may be applicable to both luma component of SAO and chroma component of SAO.

In step 3410, apparatus 400 checks for the value of the control flag for SAO at picture level to determine if SAO is enabled at picture level. If SAO is not enabled at picture level, step 3410 is "No," and process 3400 proceeds to step 3412. When SAO is not enabled at the picture level, SAO is also not enabled for all slices of that picture of the video frame. In some embodiments, step 3410 is "No" when ph_sao_luma_enabled_flag or ph_sao_chroma_enabled_flag has a value of "0." If SAO is enabled at picture level, step 3410 "Yes," and process 3400 proceeds to step 3414. When SAO is enabled at the picture level, then all slices in the picture may be enabled. In some embodiments, step 3410 is "Yes" when ph_sao_luma_enabled_flag or ph_sao_chroma_enabled_flag has a value of "1."

In some additional or alternative embodiments, the second control flag may be a control flag for either the picture level or the slice level, depending on a third control flag signaled at a picture parameter set (PPS).

In step 3412, apparatus 400 checks if the picture is the last picture in the sequence. If step 3412 is "No," apparatus 400 proceeds to step 3408 to determine the control flag for the video frame at the picture for the next picture in the sequence. Regardless of whether step 3412 is "Yes" or "No," process 3400 also proceeds to step 3422.

In step 3414, apparatus 400 determines a control flag for the video frame at the slice level for slice in the picture as determined in step 3408. The control flag for the slice may be an indication of a status for a specific slice in the picture. In some embodiments, the control flag may be an indication of whether a slice of the picture in a video frame is to be encoded using sample adaptive offset (SAO). The control flag of the slice may be an example of a third control flag. By way of example depicted in FIG. 26, slice_sao_luma_enabled_flag or slice_sao_chroma_enabled_flag may be a control flag for SAO at the slice level. In some embodiments, slice_sao_luma_enabled_flag or slice_sao_chroma_enabled_flag may have a value of "1" or "0." In some embodiments, if value of slice_sao_luma_enabled_flag or slice_sao_chroma_enabled_flag is not specified or missing, the default value may be "0."

In step 3416, apparatus 400 checks for the value of the control flag for SAO at the slice level to determine if SAO is enabled at the slice level. If SAO is not enabled at slice level, step 3416 is "No," and process 3400 proceeds to step 3418. In some embodiments, step 3416 is "No" when slice_sao_luma_enabled_flag or slice_sao_chroma_enabled_flag has a value of "0." If SAO is enabled at the slice level, step 3416 "Yes," and process 3400 proceeds to step 3420. In some embodiments, step 3416 is "Yes" when slice_sao_luma_enabled_flag or slice_sao_chroma_enabled_flag has a value of "1."

In step 3418, apparatus 400 checks if the slice is the last slice in the picture. If step 3418 is "No," apparatus 400 proceeds to step 3414 to determine the control flag for the video frame at the slice for the next slice in the picture. Regardless of whether step 3418 is "Yes" or "No," process 3400 also proceeds to step 3422.

In step 3420, apparatus 400 encodes the slice, picture, and/or sequence of the video frame using sample adaptive offset (SAO) (either luma or chroma SAO, or both based on the control flags).

In step 3422, apparatus 400 encodes the slice, picture, and/or sequence of the video frame with using sample adaptive offset (SAO) (either luma or chroma SAO, or both based on the control flags) not enabled.

Figure 35:
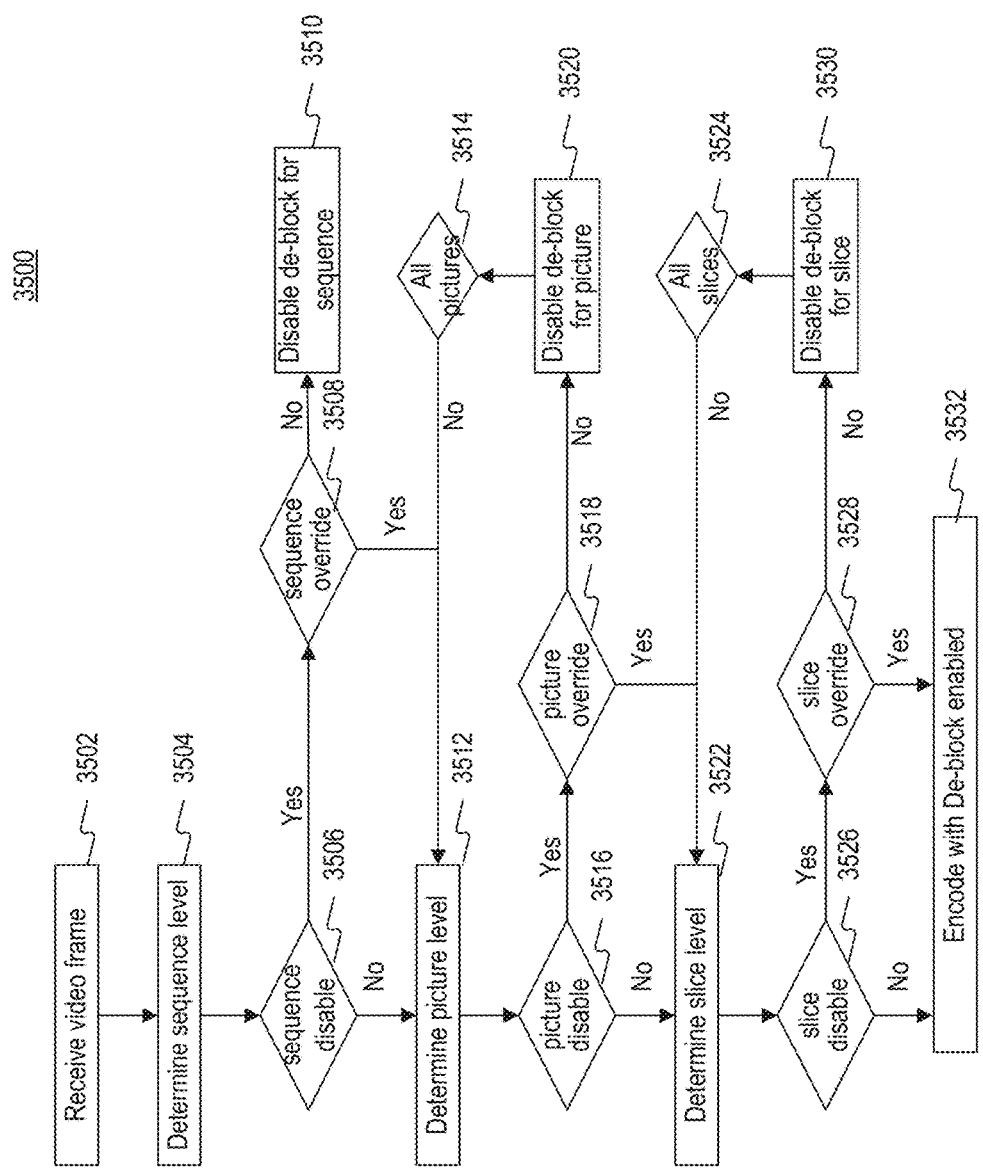
FIG. 35 is a flow chart depicting an exemplary process for determining adaptive loop filter (ALF) is disabled for a de-blocking filter for a video frame, according to some embodiments of the present disclosure.

FIG. 35 is a flow chart depicting an exemplary process for determining coding a video frame while disabling de-blocking filter, consistent with the present disclosure. Process 3500 may be performed by apparatus 400 and its sub-components, such as processor 3102.

In step 3502, apparatus 400 receives video frame or frames.

In step 3504, apparatus 400 determines a control flag for the video frame at the sequence level. The control flag for the sequence may be an indication of a status of for all pictures in the sequence. In some embodiments, the control flag may be an indication of whether the video frame is to be encoded with de-blocking filter disabled. The control flag of the sequence may be an example of a disabled flag for disabling de-blocking filter at sequence level. In some embodiments, the sequence level may be a first level. By way of example depicted in FIG. 31A, sps_deblocking_filter_disabled_flag may be a control flag for de-blocking filter at the sequence level. In some embodiments, sps_deblocking_filter_disabled_flag may have a value of "1" or "0." In step 3504, apparatus 400 further determines an override flag for the video frame at the sequence level for de-blocking filter. By way of example depicted in FIG. 31A, deblocking_filter_override_enabled_flag may be an example of an override flags at the sequence level. In some embodiments, deblocking_filter_override_enabled_flag may have a value of "1" or "0."

In step 3506, apparatus 400 checks for the value of the control flag for disabling de-blocking filter at the sequence level to determine if de-blocking is disabled at sequence level. If de-blocking is not disabled at sequence level, step 3506 is "No," and process 3500 proceeds to step 3512. When de-blocking is disabled at the sequence level, process 3500 proceeds to step 3508. In some embodiments, step 3506 is "No" when sps_deblocking_filter_disabled_flag has a value of "0." In some embodiments, step 3406 is "Yes" when sps_deblocking_filter_disabled_flag has a value of "1."

In step 3508, apparatus 400 checks for value of the override flag for disabling de-blocking filter at the sequence level. If the override flag is present for the sequence level, step 3508 is "Yes," and process 3500 proceeds to step 3512. In some embodiments, step 3508 is "Yes," when deblocking_filter_override_enabled_flag may have a value of "1." If the override flag is not present for the sequence level, step 3508 is "No," and process 3500 proceeds to step 3510. In some embodiments, step 3508 is "No," when deblocking_filter_override_enabled_flag has a value of "0."

In step 3510, when de-blocking is disabled for the entire sequence of video frame, and an override flag is not present, de-blocking filter is not used when the video frame is being encoded for the sequence.

In step 3512, apparatus 400 determines a control flag for the video frame at picture level for a picture in the sequence. The control flag for the picture may be an indication of a status of for all slices in the picture. In some embodiments, the control flag may be an indication of whether a picture of a video frame in a sequence is to be encoded with de-blocking filter disabled. In some embodiments, the picture level may be a second level. The control flag of the picture may be an example of a disabled flag for disabling de-blocking filter at picture level. By way of example depicted in FIG. 31B, ph_deblocking_filter_disabled_flag may be a control flag for de-blocking filter at the picture level. In some embodiments, ph_deblocking_filter_disabled_flag may have a value of "1" or "0." In step 3512, apparatus 400 further determines an override flag for the video frame at the picture level for de-blocking filter. By way of example depicted in FIG. 31B, ph_deblocking_filter_override_enabled_flag may be an example of an override flags at a picture level. In some embodiments, ph_deblocking_filter_override_enabled_flag may have a value of "1" or "0."

In some additional or alternative embodiments, the first level may the set of pictures level and a first control flag for the first level is signaled at Picture Parameter Set (PPS). In some additional or alternative embodiments, the second level is one of the picture level or slice level, and a second control flag for the second level is signaled at Picture Header (PH) or Slice Header (SH).

In step 3516, apparatus 400 checks for the value of the control flag for disabling de-blocking filter at the picture level to determine if de-blocking is disabled at the picture level. If de-blocking is not disabled at picture level, step 3516 is "No," and process 3500 proceeds to step 3522. When de-blocking is disabled at the picture level, process 3500 proceeds to step 3518. In some embodiments, step 3516 is "No" when ph_deblocking_filter_disabled_flag has a value of "0." In some embodiments, step 3516 is "Yes" when ph_deblocking_filter_disabled_flag has a value of "1."

In step 3518, apparatus 310 checks for value of the override flag for disabling de-blocking filter at the picture level. If the override flag is present for the picture level, step 3518 is "Yes," and process 3500 proceeds to step 3522. In some embodiments, step 3518 is "Yes," when ph_deblocking_filter_override_enabled_flag may have a value of "1." If the override flag is not present for the sequence level, step 3518 is "No," and process 3500 proceeds to step 3520. In some embodiments, step 3518 is "No," when ph_deblocking_filter_override_enabled_flag has a value of "0."

In step 3520, when de-blocking is disabled for a picture of the video frame in a sequence, and an override flag is not present, de-blocking filter is not used for that specific picture when the video frame is being encoded.

In step 3514, apparatus 400 checks if all pictures of the sequence have been processed. If step 3514 is "No," apparatus 400 proceeds to step 3512 for the next picture in the sequence.

In step 3522, apparatus 400 determines a control flag for the video frame at the slice level for the slice in the picture as determined in step 3516. The control flag for the slice may be an indication of a status for a specific slice in the picture. In some embodiments, the control flag may be an indication of whether a slice in a picture of the video frame is to be encoded with de-blocking filter disabled. The control flag of the picture may be an example of a disabled flag for disabling de-blocking filter at slice level. By way of example depicted in FIG. 31B, slice_deblocking_filter_disabled_flag may be a control flag for de-blocking filter at the slice level. In some embodiments, slice_deblocking_filter_disabled_flag may have a value of "1" or "0." In step 3522, apparatus 400 further determines an override flag for the video frame at the slice level for de-blocking filter. By way of example depicted in FIG. 31B, slice_deblocking_filter_override_enabled_flag may be an example of an override flags at a slice level. In some embodiments, slice_deblocking_filter_override_enabled_flag may have a value of "1" or "0."

In step 3526, apparatus 400 checks for the value of the control flag for disabling de-blocking filter at slice level to determine if de-blocking is disabled at slice level. If de-blocking is not disabled at slice level, step 3526 is "No," and process 3500 proceeds to step 3532. When de-blocking is disabled at the slice level, process 3500 proceeds to step 3528. In some embodiments, step 3526 is "No" when slice_deblocking_filter_disabled_flag has a value of "0." In some embodiments, step 3526 is "Yes" when slice_deblocking_filter_disabled_flag has a value of "1."

In step 3528, apparatus checks for value of the override flag for disabling de-blocking filter at slice level. If the override flag is present for the slice level, step 3528 is "Yes," and process 3500 proceeds to step 3532. In some embodiments, step 3528 is "Yes," when slice_deblocking_filter_override_enabled_flag has a value of "1." If the override flag is not present for the slice level, step 3528 is "No," and process 3500 proceeds to step 3530. In some embodiments, step 3528 is "No," when slice_deblocking_filter_override_enabled_flag has a value of "0."

In step 3530, when de-blocking is disabled for a slice of a picture in the video frame in a sequence, and an override flag is not present, de-blocking filter is not used for that slice when the video frame is being encoded.

In step 3524, apparatus 400 checks if all slices of the picture have been processed. If step 3524 is "No," apparatus 400 proceeds to step 3522 again for the next slice in the picture.

In step 3532, apparatus 400 encodes the sequence, pictures, and/slices of the video frame with de-blocking filter enabled.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

The embodiments can further be described using the following clauses:

1. A video encoding method, comprising:
    receiving a video sequence;
    encoding the video sequence by using control flags for luma mapping with chroma scaling (LMCS) at a sequence level, a picture level, or a slice level, wherein the sequence level, the picture level, and the slice level are levels ranking from high to low;
    signaling a first control flag indicating whether the LMCS is enabled at a first level; and
    in response to the first control flag indicating the LMCS is enabled at the first level, signaling a second control flag indicating whether LMCS is enabled at a second level, wherein:
    the LMCS is enabled at the second level when a value of the second control flag equals to 1;
    the LMCS is disabled at the second level when the value of the second control flag equals to 0; and
    the second level is a lower level than the first level.

2. The video encoding method of clause 1, wherein the first control flag is a control flag for the LMCS at the sequence level, and the second control flag is a control flag for the LMCS at the picture level.

3. The video encoding method of clause 2, further comprising:
    in response to the second control flag indicating the LMCS is enabled at the second level, signaling a third control flag indicating whether chroma scaling (CS) is enabled at the second level, wherein:
    the CS is enabled at the second level when a value of the third control flag equals to 1; and
    the CS is disabled at the second level when the value of the third control flag equals to 0.

4. The video encoding method of clauses 1 or 2, further comprising:
    in response to the second flag indicating the LMCS is enabled at the second level, signaling a fourth control flag indicating whether the LMCS is applied at a third level, wherein:
    luma mapping (LM) is applied and the CS can be applied at the third level when a value of the fourth control flag equals to 1;
    the LMCS is not applied at the third level when the value of the fourth control flag equals to 0; and
    the third level is a lower level than the second level.

5. The video encoding method of clause 4, wherein the third level is the slice level.

6. The video encoding method of clause 4, wherein when the second control flag is not signaled, the LMCS is not enabled for the picture associated with the second control flag.

7. The video encoding method of clauses 4 or 5, wherein when the fourth control flag is not signaled, the LMCS is not applied for the slice associated with the fourth control flag.

8. The video encoding of method of clause 1, wherein when the first control flag is signaled, the LMCS at a lower level is not enabled when the second control flag is not signaled.

9. The video encoding method of clauses 1 or 8, wherein when the first control flag is not signaled, the LMCS at a lower level is not enabled regardless of whether the second control flag is signaled.

10. A video encoding method, comprising:
    receiving a video sequence;
    encoding the video sequence by using control flags for adaptive loop filter (ALF) at a sequence level, a picture level, or a slice level, wherein the sequence level, the picture level, and the slice level are levels ranking from high to low;
    signaling a first control flag indicating whether the ALF is enabled at a first level; and
    in response to the first control flag indicating the ALF at the first level is enabled, signaling a second control flag indicating whether ALF is enabled at a second level, wherein:
    the ALF is enabled at the second level when a value of the second control flag equals to 1;
    the ALF is disabled at the second level when the value of the second control flag equals to 0; and
    the second level is a lower level than the first level.

11. The video encoding method of clause 10, further wherein the first control flag is a control flag for ALF at the sequence level, and the second control flag is a control flag for ALF at one of the picture level or the slice level depending on a third control flag signaled at a Picture Parameter Set (PPS).

12. The video encoding method of clauses 10 or 11, further comprising:
    in response to the second flag indicating the ALF is enabled at the second level, signaling a fourth control flag indicating whether Cross Component Adaptive loop filter (CCALF) is enabled for Cb color component at the second level, wherein:
    the CCALF is enabled at the second level for Cb color component when a value of the fourth control flag equals to 1; and
    the CCALF is disabled at the second level for Cb color component when the value of the fourth control flag equal to 0; and
    in response to the second flag indicating the ALF is enabled at the second level, signaling a fifth control flag indicating whether Cross Component Adaptive loop filter (CCALF) is enabled for Cr color component at the second level, wherein:
the CCALF is enabled at the second level for Cr color component when a value of the fifth control flag equals to 1; and
CCALF is disabled at the second level for Cr color component when the value of the fifth control flag equals to 0.

13. The video encoding method of clause 10, wherein when the first control flag is signaled, the ALF at the lower level is not enabled when the second control flag is not signaled.

14. The video encoding method of clauses 10 or 11, wherein when the first control flag is not signaled, the ALF at a lower level is not enabled regardless of whether the second control flag is signaled.

15. The video encoding method of clauses 10-12, wherein when a parameter of the ALF is determined in a slice header of a picture, all slices of the picture will the same the parameter of the ALF.

16. The video encoding method of clauses 10-12, wherein when the second control flag is not signaled, ALF is not enabled for the picture associated with the second control flag.

17. The video encoding method of clauses 10-12, wherein when the fourth control flag or the fifth control flag is not signaled, CCALF is not enabled for the Cb or Cr component of the picture associated with the second control flag 18. The video encoding method of clauses 10-12, wherein when the second control flag is not signaled, ALF is not applied for the slice associated with the second control flag.

19. The video encoding method of clauses 10-12, wherein when AFL is enabled, color components Y, Cb, or Cr is enabled.

20. A video encoding method, comprising:
receiving a video sequence;
encoding the video sequence by using control flags for sample adaptive offset (SAO) at a sequence level, a picture level, or a slice level, wherein the sequence level, the picture level, and the slice level are levels ranking from high to low;
signaling a first control flag indicating whether the SAO is enabled at a first level; and
in response to the first control flag indicating SAO is enabled at the first level, signaling a second control flag indicating whether the SAO is enabled at a second level, wherein:
the SAO is enabled for a luma component at the second level when a value of the second control flag equals to 1;
the SAO is disabled for a luma component at a second level when the value of the second control flag equals to 0; and
the second level is a lower level than the first level.

21. The video encoding method of clause 20, further comprising a third flag signaled at the second control flag, wherein:
the SAO is enabled for a chroma component at the second level when a value of the third control flag equals to 1; and
the SAO is disabled for a chroma component at the second level when the value of the third control flag equals to 1.

22. The video encoding method of clauses 20 or 21, wherein the first control flag is a control flag for SAO at the sequence level, and the second control flag is a control flag for SAO at one of the picture level or the slice level depending on a third flag signaled at a Picture Parameter Set (PPS).

23 The video encoding method of clauses 20 or 21, wherein when the second control flag is not signaled, the SAO is disabled for the luma component of the picture associated with the second control flag.

24. The video encoding method of clauses 20 or 21, wherein when the third control flag is not signaled, the SAO is disabled for the chroma component of the picture associated with the third control flag 25. The video encoding method of clause 20, wherein when the first control flag is signaled, the SAO at a lower level is disabled when the second control flag is not signaled.

26. The video encoding method of clauses 20 or 21, wherein when the first control flag is not signaled, the SAO at a lower level is disabled regardless of whether the second control flag is signaled.

27. The video encoding method of clauses 19-26, wherein when the SAO is enabled, a SAO process is applied to a reconstructed picture after a deblocking filter process.

28. A video encoding method, comprising:
receiving a video sequence; and
encoding the video sequence by using control flags for deblocking filter, at a sequence level, a set of pictures level, a picture level or a slice level, wherein:
the deblocking filter is disabled at the first level when a value of a first control flag at a first level equals to 1 and a second control flag at a second level is not signaled, and
the deblocking filter is enabled at the first level when the value of the first control flag at the first level equals to 0 and the second control flag at the second level is not signaled; and
the first level is a higher lower than the second level.

29. The video encoding method of clause 28, wherein the first level is the set of pictures level and the first control flag is signaled at Picture Parameter Set (PPS); and the second level is one of the picture level or the slice level, and the second control flag is signaled at one of Picture Header (PH) or Slice Header (SH).

30. The video method of clause 28, further comprising: signaling a third flag at PPS to indicate whether the second flag is signaled at the picture level or slice level.

31. The video encoding method of clause 28, further comprising encoding the video sequence by using override flags for deblocking filter, at the sequence level, the set of pictures level, the picture level or the slice level wherein the override flag is to indicate whether a lower level control flag can be signaled to override a higher level control flag.

32. The video encoding method of clause 28, further comprising encoding the video sequence by using override flags for deblocking filter, at the sequence level, the set of pictures level, the picture level or the slice level, wherein the override flag is to indicate whether a lower level control flag can be signaled to override a higher level control flag, and
when the higher control flag signaled at the sequence level, the set of pictures level, the picture level, or the slice level, is equal to 1, de-blocking filter is not applied to the corresponding sequence, set of pictures, picture, or slice when the lower level control flag does not override the higher control flag.

33. A video decoding method, comprising:
  receiving a bit stream containing a video sequence;
  decoding the video sequence by using control flags for luma mapping with chroma scaling (LMCS) at a sequence level, a picture level, or a slice level, wherein the sequence level, the picture level, and the slice level are levels ranking from high to low;
  determining whether a first control flag indicates the LMCS is enabled at a first level; and
  in response to a determination that the first control flag indicates the LMCS is enabled at the first level, determining whether a second control flag indicates LMCS is enabled at a second level, wherein:
    the LMCS is enabled at the second level when a value of the second control flag equals to 1;
    the LMCS is disabled at the second level when the value of the second control flag equals to 0; and
    the second level is a lower level than the first level.

34. The video decoding method of clause 33, wherein the first control flag is a control flag for the LMCS at the sequence level, and the second control flag is a control flag for the LMCS at the picture level.

35. The video decoding method of clause 34, further comprising:
  in response to a determination that the second control flag indicates the LMCS is enabled at the second level, determining whether a third control flag indicates chroma scaling (CS) is enabled at the second level, wherein:
    the CS is enabled at the second level when a value of the third control flag equals to 1; and
    the CS is disabled at the second level when the value of the third control flag equals to 0.

36. The video decoding method of clauses 33 or 34, further comprising:
  in response to a determination that the second flag indicates the LMCS is enabled at the second level, determining whether a fourth control flag indicates LMCS is applied at a third level, wherein:
    luma mapping (LM) is applied and the CS can be applied at the third level when a value of the fourth control flag equals to 1;
    the LMCS is not applied at the third level when the value of the fourth control flag equals to 0; and
    the third level is a lower level than the second level.

37. The video decoding method of clause 36, wherein the third level is the slice level.

38. The video decoding method of clause 36, wherein when the second control flag is not signaled, LMCS is not enabled for the picture associated with the second control flag.

39. The video decoding method of clauses 36 or 38, wherein when the fourth control flag is not signaled, LMCS is not applied for the slice associated with the fourth control flag.

40. The video decoding of method of clause 33, wherein when the first control flag is signaled, the LMCS at a lower level is not enabled when the second control flag is not signaled.

41. The video decoding method of clauses 33 or 40, wherein when the first control flag is not signaled, the LMCS at a lower level is not enabled regardless of whether the second control flag is signaled.

42. A video decoding method, comprising:
  receiving a bit stream containing a video sequence;
  decoding the video sequence by using control flags for adaptive loop filter (ALF) at a sequence level, a picture level, or a slice level, wherein the sequence level, the picture level, and the slice level are levels ranking from high to low;
  determining whether a first control flag indicates the ALF is enabled at a first level; and
  in response to a determination that the first control flag indicates the ALF is enabled at the first level, determining whether a second control flag indicates ALF is enabled at a second level, wherein:
    the ALF is enabled at the second level when a value of the second control flag equals to 1;
    the ALF is disabled at the second level when the value of the second control flag equals to 0; and
    the second level is a lower level than the first level.

43. The video decoding method of clauses 42, further wherein the first control flag is a control flag for ALF at sequence level, and the second control flag is a control flag for ALF at one of the picture level or the slice level depending on a third control flag signaled at a Picture Parameter Set (PPS).

44. The video decoding method of clauses 42 or 43, further comprising:
  in response to the determination that the second flag indicates the ALF is enabled at the second level, determining whether a fourth control flag indicates Cross Component Adaptive loop filter (CCALF) is enabled for Cb color component at the second level, wherein:
    CCALF is enabled at the second level for Cb color component when a value of the fourth control flag equals to 1; and
    the CCALF is disabled at the second level for Cb color component when the value of the fourth control flag equal to 0; and
  in response to the determination that the second flag indicates the ALF is enabled at the second level, signaling a fifth control flag indicates Cross Component Adaptive loop filter (CCALF) is enabled for Cr color component at the second level, wherein:
    the CCALF is enabled at the second level for Cr color component when a value of the fifth control flag equals to 1; and
    CCALF is disabled at the second level for Cr color component when the value of the fifth control flag equals to 0.

45. The video decoding method of clause 42, wherein when the first control flag is present, the ALF at the lower level is not enabled when the second control flag is not present.

46. The video decoding method of clauses 42 or 43, wherein when the first control flag is not present, the ALF at a lower level is not enabled regardless of whether the second control flag is present.

47. The video decoding method of clauses 42-44, wherein when a parameter of the ALF is determined in a slice header of a picture, all slices of the picture will the same the parameter of the ALF.

48. The video decoding method of clauses 42-44, wherein when the second control flag is not present, ALF is not enabled for the picture associated with the second control flag.

49. The video encoding method of clauses 42-44, wherein when the fourth control flag or the fifth control flag is not signaled, CCALF is not enabled for the Cb or Cr component of the picture associated with the second control flag 50. The video decoding method of clauses 42-44, wherein when the second control flag is not present, ALF is not enabled for the slice associated with the second control flag.

51. The video decoding method of clauses 42-44, wherein when AFL is enabled, color components Y, Cb, or Cr is enabled.

52. A video decoding method, comprising:
receiving a bit stream containing a video sequence;
decoding the video sequence by using control flags for sample adaptive offset (SAO) at a sequence level, a picture level, or a slice level, wherein the sequence level, the picture level, and the slice level are levels ranking from high to low;
determining whether a first control flag indicates the SAO is enabled at a first level; and
in response to a determination that the first control flag indicates SAO is enabled at the first level, determining whether a second control flag indicates the SAO is enabled at a second level, wherein:
the SAO is enabled for a luma component at the second level when a value of the second control flag equals to 1;
the SAO is disabled for a luma component at a second level when the value of the second control flag equals to 0; and
the second level is a lower level than the first level.

53. The video decoding method of clause 52, further comprise
determining whether a third flag indicates the SAO is enabled at the second level, wherein:
the SAO is enabled for a chroma component at the second level when a value of the third control flag equals to 1; and
the SAO is disabled for a chroma component at the second level when the value of the third control flag equals to 1.

54. The video decoding method of clauses 52 or 53, wherein the first control flag is a control flag for SAO at sequence level, and the second control flag is a control flag for SAO at one of the picture level or the slice level depending on a third flag signaled at a Picture Parameter Set (PPS).

55 The video encoding method of clauses 52 or 53, wherein when the second control flag is not present, the SAO is disabled for the luma component of the picture associated with the second control flag.

56 The video encoding method of clauses 52 or 53, wherein when the third control flag is not present, the SAO is disabled for the chroma component of the picture associated with the third control flag 57. The video decoding method of clause 52, wherein when the first control flag is present, the SAO at a lower level is disabled when the second control flag is not present.

58. The video decoding method of clauses 52 or 54, wherein when the first control flag is not present, the SAO at a lower level is disabled regardless of whether the second control flag is present.

59. The video decoding method of clauses 52-58, wherein when the SAO is enabled, a SAO process is applied to a reconstructed picture after a deblocking filter process.

60. A video decoding method, comprising:
receiving a bit stream containing a video sequence; and
decoding the video sequence by using control flags for deblocking filter, at a sequence level, a set of pictures level, a picture level or a slice level, wherein:
the deblocking filter is disabled at the first level when value of a first control flag at a first level equals to 1 and a second control flag at a second level is not present, and
the deblocking filter is enabled at the first level when the value of the first control flag at the first level equals to 0 and the second control flag at the second level is not present; and
the first level is a higher lower than the second level.

61. The video decoding method of clause 60, wherein the first level is the set of pictures level and the first control flag is signaled at Picture Parameter Set (PPS); and the second level is one of the picture level or the slice level, and the second control flag is signaled at one of Picture Header (PH) or Slice Header (SH).

62. The video method of clause 60, further comprising:
determining whether the second flag is signaled at the picture level or slice level based on a third flag signaled in PPS.

63. The video decoding method of clause 60, further comprising decoding the video sequence by using override flags for deblocking filter, at the sequence level, the set of pictures level, the picture level or the slice level wherein the override flag is to indicate whether a lower level control flag can be present to override a higher level control flag.

64. The video decoding method of clause 60, further comprising decoding the video sequence by using override flags for deblocking filter, at the sequence level, the set of pictures level, the picture level or the slice level, wherein the override flag is to indicate whether a lower level control flag can be present to override a higher level control flag, and
when the higher control flag present at the sequence level, the set of pictures level, the picture level, or the slice level, is equal to 1, de-blocking filter is not applied to the corresponding sequence, set of pictures, picture, or slice when the lower level control flag does not override the higher control flag.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A video encoder, comprising:
   a memory storing a set of instructions; and
   at least one processor configured to execute the set of instructions to cause the video encoder to perform operations comprising:
   receive a video sequence;
   encode the video sequence by using control flags for sample adaptive offset (SAO) at a sequence level, a picture level, or a slice level, wherein the sequence level, the picture level, and the slice level are levels ranking from high to low;
   signal a first control flag indicating whether the SAO is enabled at a first level; and
   in response to the first control flag indicating SAO is enabled at the first level, signal a second control flag indicating whether the SAO is enabled at a second level, wherein:
   the SAO is enabled for a luma component at a second level when a value of the second control flag equals to a first value,
   the SAO is disabled for a luma component at the second level when the value of the second control flag equals to a second value, and
   the second level is a lower level than the first level,
   wherein the first control flag is a control flag for the SAO at the sequence level, and the second control flag is a control flag for the SAO at the picture level or the slice level, and
   wherein whether the SAO is at the picture level or at the slice level is determined based on a third control flag signaled at a picture parameter set (PPS).

2. The video encoder of claim 1, wherein the operations further comprise:
   determine whether to signal the third control flag at the PPS, wherein when the third control flag is signaled at the PPS:
   the SAO is enabled for a chroma component at the second level when a value of the third control flag is equal to a first value, and
   the SAO is disabled for the chroma component at the second level when the value of the third control flag is equal to the second value.

3. The video encoder of claim 2, wherein when the third control flag is not signaled at the PPS, the SAO is disabled for the chroma component of the picture associated with the third control flag.

4. The video encoder of claim 1, wherein when the second control flag is not signaled, the SAO is disabled for the luma component of the picture associated with the second control flag.

5. A video decoder, comprising:
   a memory storing a set of instructions; and
   at least one processor configured to execute the set of instructions to cause the decoder to perform operations comprising:
   receive a bitstream;
   decode the bitstream by using control flags for sample adaptive offset (SAO) at a sequence level, a picture level, or a slice level, wherein the sequence level, the picture level, and the slice level are levels ranking from high to low;
   determine whether a first control flag indicates that the SAO is enabled at a first level; and
   in response to a determination that the first control flag indicates that the SAO is enabled at the first level, determine whether a second control flag indicates that the SAO is enabled at a second level, wherein:
   the SAO is enabled for a luma component at a second level when a value of the second control flag is equal to a first value,
   the SAO is disabled for the luma component at the second level when the value of the second control flag is equal to a second value, and
   the second level is a level lower than the first level,
   wherein the first control flag is a control flag for the SAO at sequence level, and the second control flag is a control flag for the SAO at the picture level or at the slice level, and
   wherein whether the SAO is at the picture level or at the slice level is determined based on a third control flag signaled at a picture parameter set (PPS).

6. The video decoder of claim 5, wherein the operations further comprise:
   determine whether the third control flag indicates that the SAO is enabled at the second level, wherein:
   the SAO is enabled for a chroma component at the second level when a value of the third control flag is equals to the first value, and
   the SAO is disabled for the chroma component at the second level when the value of the third control flag is equal to the second value.

7. The video decoder of claim 5, wherein when the second control flag is not present, the SAO is disabled for the luma component of the picture associated with the second control flag.

8. The video decoder of claim 6, wherein when the third control flag is not present, the SAO is disabled for the chroma component of the picture associated with the third control flag.

9. A non-transitory computer readable medium storing a video sequence that is processed according to a method comprising:
- receiving a video sequence;
- encoding the video sequence by using control flags for sample adaptive offset (SAO) at a sequence level, a picture level, or a slice level, wherein the sequence level, the picture level, and the slice level are levels ranking from high to low;
- signaling a first control flag indicating whether the SAO is enabled at a first level; and
- in response to the first control flag indicating SAO is enabled at the first level, signaling a second control flag indicating whether the SAO is enabled at a second level, wherein:
  - the SAO is enabled for a luma component at a second level when a value of the second control flag is equal to the first value,
  - the SAO is disabled for a luma component at the second level when the value of the second control flag is equal to the second value, and
  - the second level is a lower level than the first level,
  - wherein the first control flag is a control flag for the SAO at the sequence level, and the second control flag is a control flag for the SAO at the picture level or the slice level, and
  - wherein whether the SAO is at the picture level or at the slice level is determined based on a third control flag signaled at a picture parameter set (PPS).

10. The non-transitory computer readable medium of claim 9, wherein the method further comprises:
- determining whether to signal the third control flag at the second control flag PPS, wherein when the third control flag is signaled at the second control flag:
  - the SAO is enabled for a chroma component at the second level when a value of the third control flag is equal to the first value, and
  - the SAO is disabled for the chroma component at the second level when the value of the third control flag is equal to the second value.

11. A non-transitory computer readable medium storing a bitstream that is processed according to a method comprising:
- receiving the bitstream;
- decoding the bitstream by using control flags for sample adaptive offset (SAO) at a sequence level, a picture level, or a slice level, wherein the sequence level, the picture level, and the slice level are levels ranking from high to low;
- determining whether a first control flag indicates that the SAO is enabled at a first level; and
- in response to a determination that the first control flag indicates that the SAO is enabled at the first level, determining whether a second control flag indicates that the SAO is enabled at a second level, wherein:
  - the SAO is enabled for a luma component at a second level when a value of the second control flag is equal to a first value,
  - the SAO is disabled for the luma component at the second level when the value of the second control flag is equal to a second value, and
  - the second level is a level lower than the first level,
  - wherein the first control flag is a control flag for the SAO at sequence level, and the second control flag is a control flag for the SAO at the picture level or at the slice level, and
  - wherein whether the SAO is at the picture level or at the slice level is determined based on a third control flag signaled at a picture parameter set (PPS).

12. The non-transitory computer readable medium of claim 11, wherein the method further comprises:
- determining whether the third control flag indicates that the SAO is enabled at the second level, wherein:
  - the SAO is enabled for a chroma component at the second level when a value of the third control flag is equals to the first value, and
  - the SAO is disabled for the chroma component at the second level when the value of the third control flag is equal to the second value.

* * * * *